US011603111B2

(12) United States Patent
Hashimoto et al.

(10) Patent No.: US 11,603,111 B2
(45) Date of Patent: Mar. 14, 2023

(54) VEHICLE CONTROLLER, VEHICLE CONTROL SYSTEM, AND LEARNING DEVICE FOR VEHICLE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 294 days.

(21) Appl. No.: 16/948,789

(22) Filed: Oct. 1, 2020

(65) Prior Publication Data

US 2021/0114607 A1  Apr. 22, 2021

(30) Foreign Application Priority Data

Oct. 18, 2019 (JP) .............................. JP2019-191092
Dec. 23, 2019 (JP) .............................. JP2019-231143

(51) Int. Cl.
*B60W 50/06* (2006.01)
*B60W 50/04* (2006.01)
(Continued)

(52) U.S. Cl.
CPC ............ *B60W 50/06* (2013.01); *B60W 50/04* (2013.01); *G06N 20/00* (2019.01); *G07C 5/08* (2013.01); *B60W 10/06* (2013.01); *B60W 10/10* (2013.01)

(58) Field of Classification Search
CPC ................. B60W 10/06; B60W 10/10; B60W 2050/0088; B60W 2510/1005;
(Continued)

(56) References Cited

U.S. PATENT DOCUMENTS 6,199,002 B1  3/2001 Otaki et al.
6,549,815 B1  4/2003 Kaji
(Continued)

FOREIGN PATENT DOCUMENTS

JP  H10-254505 A  9/1998
JP  2000-250604 A  9/2000
(Continued)

*Primary Examiner* — Carl C Staubach
(74) *Attorney, Agent, or Firm* — Oblon, McClelland, Maier & Neustadt, L.L.P.

(57) ABSTRACT

A vehicle controller includes processing circuitry and a storage device. The storage device stores relationship specifying data that specifies a relationship between a vehicle state and an action variable. The processing circuitry is configured to execute an obtaining process obtaining the vehicle state, an operating process operating an electronic device based on a value of the action variable, a reward calculation process assigning a reward based on the vehicle state, an updating process updating the relationship specifying data using the vehicle state, the value of the action variable, and the reward as inputs to an update mapping. When a value of the action variable designated by the relationship specifying data is a first value, a process in which the operating process operates the electronic device in accordance with the first value is executable in a first situation and is not executable in a second situation.

10 Claims, 10 Drawing Sheets

(51) Int. Cl.
*G06N 20/00* (2019.01)
*G07C 5/08* (2006.01)
*B60W 10/10* (2012.01)
*B60W 10/06* (2006.01)

(58) Field of Classification Search
CPC ......... B60W 2520/10; B60W 2540/10; B60W 2552/15; B60W 2552/30; B60W 2556/40; B60W 2556/50; B60W 50/0098; B60W 50/04; B60W 50/06; G06N 20/00; G06N 3/006; G06N 3/02; G06N 7/005; G07C 5/08; G07C 5/0808; G07C 5/0841
See application file for complete search history.

(56) References Cited

U.S. PATENT DOCUMENTS

| | | | | |
|---|---|---|---|---|
| 10,061,316 B2* | 8/2018 | Nishi | ................... | G06N 3/006 |
| 11,205,124 B1* | 12/2021 | Yang | ................... | G05B 13/042 |
| 11,225,923 B2* | 1/2022 | Hashimoto | ......... | F02D 41/1486 |
| 11,230,984 B2* | 1/2022 | Hashimoto | ......... | F02D 41/2422 |
| 11,268,467 B2* | 3/2022 | Hashimoto | ......... | F02D 41/2422 |
| 11,310,250 B2* | 4/2022 | Kursun | ................. | G06N 5/047 |
| 11,420,644 B2* | 8/2022 | Bunazawa | ............ | B60W 10/08 |
| 11,421,622 B2* | 8/2022 | Hashimoto | ............ | F02D 41/22 |
| 11,459,962 B2* | 10/2022 | Sudarsan | ............ | F02D 41/1406 |
| 2004/0078095 A1* | 4/2004 | Mizutani | ............ | F02D 41/1401 700/20 |
| 2019/0378036 A1* | 12/2019 | Tuzi | ...................... | G06N 3/006 |
| 2020/0063676 A1* | 2/2020 | Neema | .................. | G06N 20/00 |
| 2020/0063681 A1* | 2/2020 | Neema | ................ | F02D 41/2454 |
| 2020/0398859 A1* | 12/2020 | Borhan | ................. | F01N 3/2066 |
| 2021/0065897 A1* | 3/2021 | Upadhyay | ............ | G06N 7/005 |
| 2021/0115834 A1* | 4/2021 | Hashimoto | ........... | F01N 11/005 |
| 2021/0115866 A1* | 4/2021 | Hashimoto | ......... | F02D 41/0007 |
| 2021/0189990 A1* | 6/2021 | Hashimoto | ......... | F02D 41/2438 |

FOREIGN PATENT DOCUMENTS

| | | |
|---|---|---|
| JP | 2016-006327 A | 1/2016 |
| JP | 2019-081531 A | 5/2019 |
| JP | 6547991 B1 | 7/2019 |

* cited by examiner

VEHICLE CONTROLLER, VEHICLE CONTROL SYSTEM, AND LEARNING DEVICE FOR VEHICLE

BACKGROUND

1. Field

The following description relates to a vehicle controller, a vehicle control system, and a learning device for a vehicle.

2. Description of Related Art

Japanese Laid-Open Patent Publication No. 2016-6327 describes an example of a controller that operates a throttle valve, that is, an operating unit of an internal combustion engine mounted on a vehicle, based on a value obtained by processing an operation amount of an accelerator pedal through a filter.

The filter needs to be configured to set an appropriate operation amount of the throttle valve of the internal combustion engine mounted on the vehicle in accordance with the operation amount of the accelerator pedal. Therefore, one skilled in the art typically needs to perform a large amount of work for adaptation of the filter. That is, one skilled in the art performs a large amount of work for adaptation of, for example, an operation amount of an electronic device installed in a vehicle in accordance with the state of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure and their operation and advantages are as follows.

Aspect 1. An aspect of the present disclosure provides a vehicle controller. The vehicle controller includes processing circuitry and a storage device. The storage device stores relationship specifying data that specifies a relationship between a state of a vehicle and an action variable. The action variable is a variable related to an operation of an electronic device in the vehicle. The processing circuitry is configured to execute an obtaining process, an operating process, a reward calculation process, and an updating process. The obtaining process obtains a state of the vehicle based on a detection value of a sensor. The operating process operates the electronic device based on a value of the action variable determined by the state of the vehicle obtained by the obtaining process and the relationship specifying data. The reward calculation process assigns a reward based on the state of the vehicle obtained by the obtaining process. The reward assigned when a property of the vehicle meets a criterion is greater than the reward assigned when the property of the vehicle does not meet the criterion. The updating process updates the relationship specifying data using the state of the vehicle obtained by the obtaining process, the value of the action variable used for operation of the electronic device, and the reward corresponding to the operation as inputs to a predetermined updating mapping. The updating mapping outputs the relationship specifying data that has been updated to increase an expected return of the reward when the electronic device is operated in accordance with the relationship specifying data. When a value of the action variable designated by the relationship specifying data is a first value, a process in which the operating process operates the electronic device in accordance with the first value is executable in a first situation and is not executable in a second situation.

The above configuration calculates a reward corresponding to operation of the electronic device to acknowledge what type of reward is obtained through the operation. The relationship specifying data is updated based on the reward using the updating mapping in accordance with reinforcement learning. Thus, the relationship between the state of the vehicle and the action variable is appropriately set for traveling of the vehicle. This reduces the amount of work performed by one skilled in the art when setting the relationship between the state of the vehicle and the action variable to a relationship appropriate for traveling of the vehicle.

When performing reinforcement learning, the action variable may have a value that largely deviates from a value appropriate for control of the vehicle. In this regard, in the above configuration, the first value, which is a value of the action variable that is usable in the first situation, is set so as not to be used in the second situation, and the second situation is set to a situation in which use of the first value is inappropriate. This restricts inappropriate operation.

Aspect 2. In the vehicle controller according to aspect 1, a state of the vehicle corresponding to the first situation is a first state, and a state of the vehicle corresponding to the second situation is a second state. In the relationship specifying data, the first value may be defined as a value of the action variable for the first state, whereas the first value is not defined as a value of the action variable for the second state.

The above configuration sets the relationship specifying data so that the first value is not allowed in the second situation, thereby avoiding a situation in which an operation using the value of the action variable designated by the relationship specifying data is inappropriate.

Aspect 3. In the vehicle controller according to aspect 1, the operating process may include a restriction process. When the value of the action variable designated by the relationship specifying data is the first value, the restriction process allows a process that operates the electronic device in accordance with the first value in the first situation. When the value of the action variable designated by the relationship specifying data is the first value, the restriction process prohibits a process that operates the electronic device in accordance with the first value in the second situation.

In the above configuration, the operating process includes the restriction process. As a result, even when the value of the action variable designated by the relationship specifying data is inappropriate for the operation, a situation in which the operation is executed in accordance with the inappropriate value of the action variable is avoided.

Aspect 4. In the vehicle controller according to aspect 3, the first situation may be a situation in which an absolute value of a difference between a previous value of the action variable and the first value is less than or equal to a predetermined value. The second situation may be a situation in which the absolute value of the difference between the previous value of the action variable and the first value is greater than the predetermined value.

The above configuration prohibits operation in accordance with the first value when the absolute value of the difference between the previous value of the action variable and the first value is greater than the predetermined value.

This restricts a change in the value of the action variable by the predetermined value or more.

Aspect 5. In the vehicle controller according to aspect 4, the restriction process may include a storing process that stores the previous value of the action variable and a process that restricts a present value of the action variable so that an absolute value of a difference between the present value of the action variable and the previous value of the action variable is less than or equal to a predetermined value.

The above configuration restricts the present value so that the absolute value of the difference between the stored previous value and the present value is less than or equal to the predetermined value. This restricts sudden changes in the value of the action variable used in an actual process by the operating process.

Aspect 6. In the vehicle controller according to aspect 3, the relationship specifying data may include data specifying a function approximator that uses the state of the vehicle as an input and outputs a selection probability of a value of the action variable. The updating mapping may include a mapping that outputs an update amount of a parameter that specifies the function approximator. The restriction process may include a process that prohibits an operation of the electronic device in accordance with a value of the action variable having a selection probability output by the function approximator that is less than a predetermined value. The first situation may be a situation in which a selection probability of the first value is greater than or equal to the predetermined value. The second situation may be a situation in which the selection probability of the first value is less than the predetermined value.

When the function approximator that outputs a selection probability of the value of the action variable is used, a value having a low probability may be inappropriate for use in the operating process. In this regard, the above configuration prohibits an operation of the electronic device corresponding to the value of the action variable, the selection probability of which is less than the predetermined value, thereby avoiding a situation in which the operating process executes an inappropriate process.

Aspect 7. In the vehicle controller according to aspect 4, the restriction process may include a storing process that stores a previous value of a value of a variable indicating the state that is used to calculate a value of the action variable together with the relationship specifying data and a correction process that corrects the value of the variable indicating the state, when an absolute value of a difference between the previous value and a present value of the value of the variable indicating the state is greater than a specified value, so that the absolute value of the difference from the previous value is less than or equal to the specified value.

If the value of the variable indicating the state is suddenly changed by noise or the like, the value of the action variable calculated by the corresponding relationship specifying data may suddenly change. In this regard, the above configuration corrects the value of the variable indicating the state that determines the value of the action variable together with the relationship specifying data so that the absolute value of the difference between the previous value and the present value of the variable indicating the state is less than or equal to the specified value. This restricts sudden changes in the value of the action variable calculated by the relationship specifying data.

Aspect 8. An aspect of the present disclosure provides a vehicle control system. The vehicle control system includes the processing circuitry and the storage device according to any one of aspects 1 to 7. The processing circuitry includes a first execution device mounted on the vehicle and a second execution device that is different from an on-board device. The second execution device is configured to execute at least the updating process. The first execution device is configured to execute at least the obtaining process and the operating process.

In the above configuration, the updating process is executed by the second execution device. This reduces calculation loads on the first execution device as compared to a configuration in which the first execution device executes the updating process.

The phrase "second execution device being a device different from an on-board device" means that the second execution device is not an on-board device.

Aspect 9. An aspect of the present disclosure provides a vehicle controller including the first execution device according to aspect 8.

Aspect 10. An aspect of the present disclosure provides a learning device for a vehicle. The learning device includes the second execution device according to aspect 8.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a vehicle controller will now be described with reference to the drawings.

Figure 1:
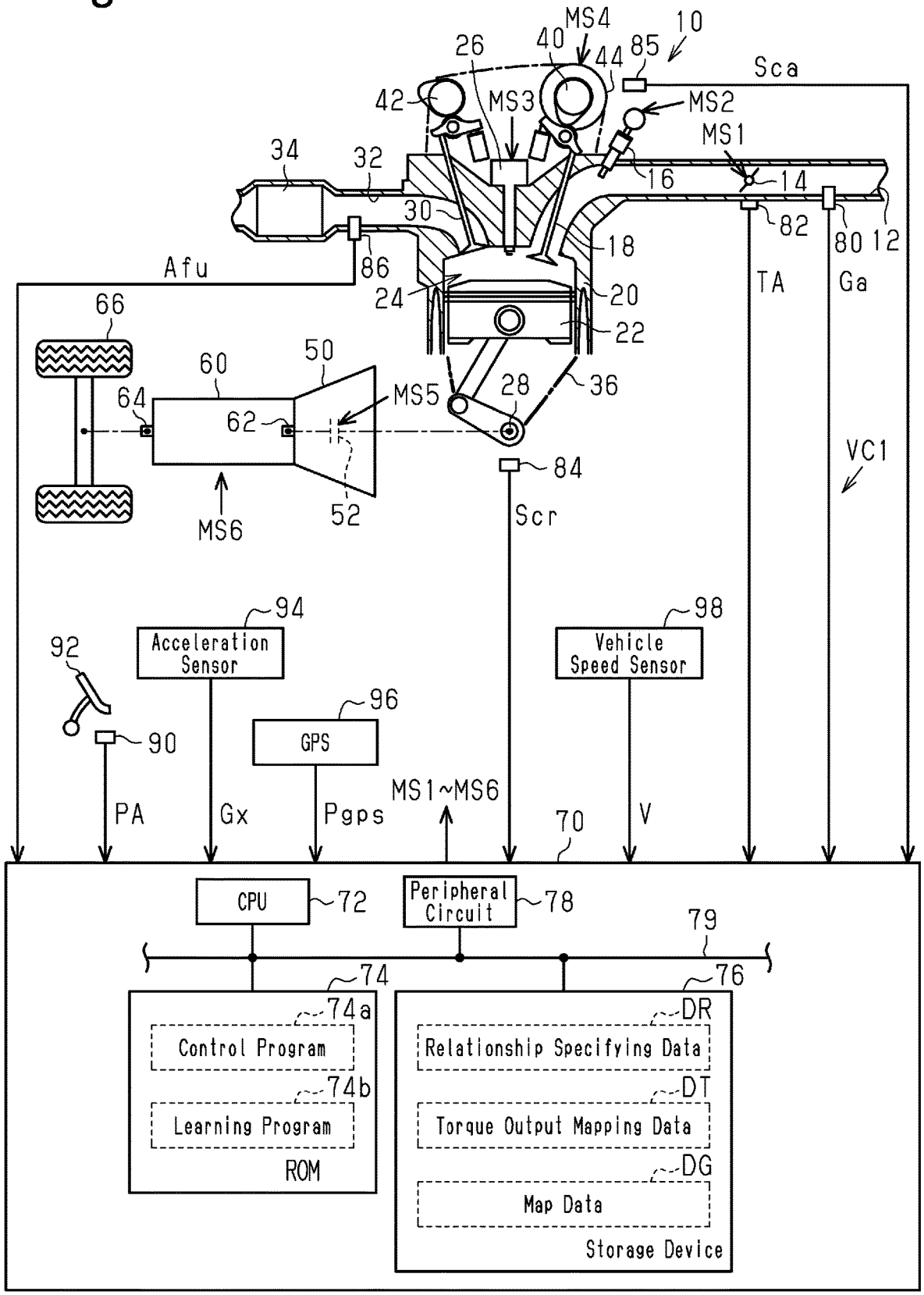
FIG. 1 is a diagram showing the configurations of a controller and a drive system in a first embodiment.

FIG. 1 is a diagram showing the configurations of a drive system and a controller of a vehicle VC1 in the present embodiment.

As shown in FIG. 1, an internal combustion engine 10 includes an intake passage 12 provided with a throttle valve 14 and a fuel injection valve 16, which are sequentially arranged from the upstream side. When an intake valve 18 is open, air drawn into the intake passage 12 and fuel injected from the fuel injection valve 16 flow into a combustion chamber 24 defined by a cylinder 20 and a piston 22. In the combustion chamber 24, a mixture of the air and the fuel is burned by spark discharge of an ignition device 26, and energy generated by the combustion is converted into rotational energy of a crankshaft 28 via the piston 22. The burned air-fuel mixture is discharged to an exhaust passage 32 as exhaust when an exhaust valve 30 is open. The exhaust passage 32 is provided with a catalyst 34 used as a post-processing device that purifies the exhaust.

Rotational power of the crankshaft 28 is transmitted to an intake camshaft 40 and an exhaust camshaft 42 through a timing chain 36. More specifically, the rotational power of the crankshaft 28 is transmitted to the intake camshaft 40 through an intake valve timing variable device 44.

The crankshaft 28 is configured to be mechanically coupled to an input shaft 62 of a transmission 60 by a torque converter 50 including a lock-up clutch 52. The transmission 60 is a device that changes the transmission ratio, that is, the ratio of rotation speed of the input shaft 62 to rotation speed of an output shaft 64. The output shaft 64 is mechanically coupled to drive wheels 66.

The internal combustion engine 10 is controlled by a controller 70, which operates operating units of the internal combustion engine 10 such as the throttle valve 14, the fuel injection valve 16, the ignition device 26, and the intake valve timing variable device 44 to control torque, an exhaust component ratio, and other control aspects. The controller 70 also controls the torque converter 50 and operates the lock-up clutch 52 to control the engagement state of the lock-up clutch 52. The controller 70 also controls the transmission 60 and operates the transmission 60 to control the transmission ratio, which is the control aspect. FIG. 1 shows operating signals MS1 to MS6 of the throttle valve 14, the fuel injection valve 16, the ignition device 26, the intake valve timing variable device 44, the lock-up clutch 52, and the transmission 60, respectively.

To control the control aspects, the controller 70 refers to an intake air amount Ga that is detected by an airflow meter 80, an opening degree (throttle opening degree TA) of the throttle valve 14 that is detected by a throttle sensor 82, an output signal Scr of a crank angle sensor 84, and a detection value Afu of an air-fuel ratio sensor 86 arranged at the upstream side of the catalyst 34. In addition, the controller 70 refers to an output signal Sca of a cam angle sensor 85 that detects a rotation phase of the intake camshaft 40, a depression amount (accelerator operation amount PA) of an accelerator pedal 92 that is detected by an accelerator sensor 90, and an acceleration rate Gx in the front-rear direction of the vehicle VC1 detected by an acceleration sensor 94. The controller 70 also obtains position data Pgps from a global positioning system (GPS) 96 and a vehicle speed V detected by a vehicle speed sensor 98.

The controller 70 includes a central processing unit (CPU) 72, a read only memory (ROM) 74, an electrically rewritable nonvolatile memory (storage device 76), and a peripheral circuit 78, which are configured to communicate with each other through a local network 79. The peripheral circuit 78 includes a circuit that generates a clock signal regulating an internal operation, a power supply circuit, a reset circuit, and the like.

The ROM 74 stores a control program 74a and a learning program 74b. The storage device 76 stores relationship specifying data DR, torque output mapping data DT, and map data DG. The relationship specifying data DR specifies the relationship of a transmission ratio GR of the transmission 60 with the present transmission ratio GR of the transmission 60, the accelerator operation amount PA, the vehicle speed V, a road gradient SL, and a road curvature CU.

Figure 2:
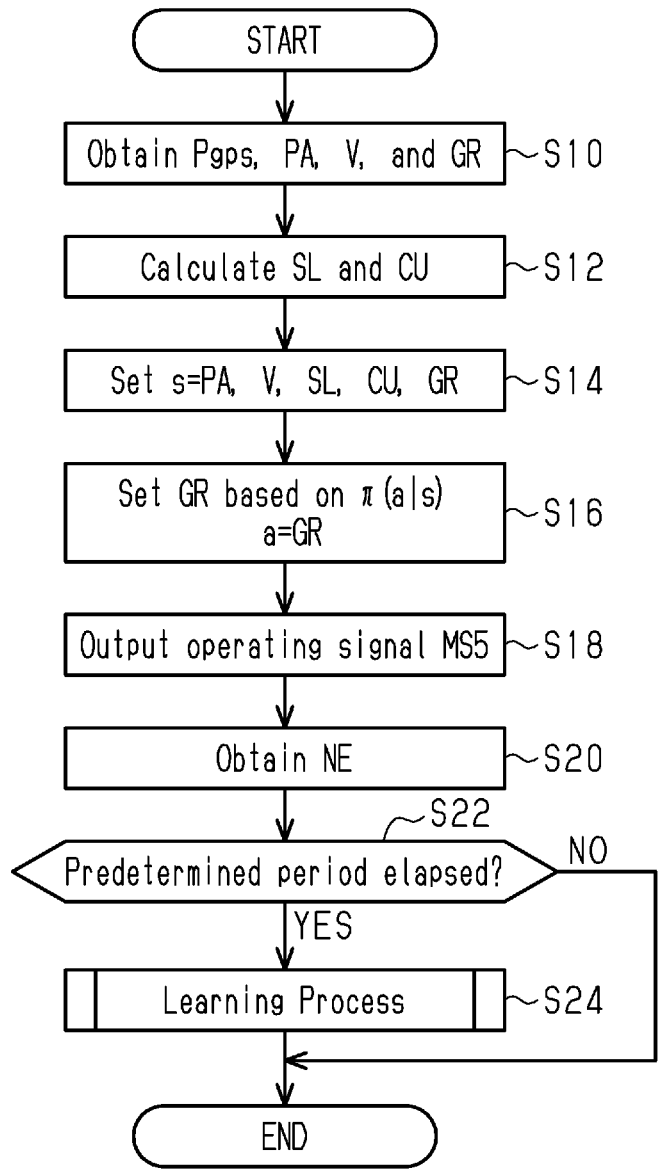
FIG. 2 is a flowchart showing the procedures of a process executed by the controller in the first embodiment.

FIG. 2 shows the procedures of a process executed by the controller 70 related to control of the transmission ratio of the transmission 60. The process shown in FIG. 2 is implemented by the CPU 72, for example, repeatedly executing a program stored in the ROM 74 in a predetermined cycle. In the following description, the step number of each process is represented by a numeral provided with an "S" prefix.

In a series of the processes shown in FIG. 2, the CPU 72 first obtains the position data Pgps, the accelerator operation amount PA, the vehicle speed V, and the transmission ratio GR (S10). Next, the CPU 72 calculates the gradient SL and the curvature CU of the road on which the vehicle VC1 is traveling based on the position data Pgps and the map data DG (S12). More specifically, the CPU 72 specifies a position on the map indicated by the map data DG based on the position data Pgps to specify the gradient SL and the curvature CU of the road proximate to the specified position. The CPU 72 sets the accelerator operation amount PA, the vehicle speed V, and the present transmission ratio GR, which are obtained in S10, and the gradient SL and the curvature CU, which are calculated in S12, to a state s (S14).

The CPU 72 sets the transmission ratio GR corresponding to the state s, which is obtained in S14, in accordance with a policy π determined by the relationship specifying data DR (S16).

In the present embodiment, the relationship specifying data DR determines an action value function Q and the policy π. In the present embodiment, the action value function Q is a table-type function indicating values of expected return corresponding to a sextic independent variable of the state s and an action a. When the state s is given, the policy π gives priority to selecting the maximum action a (greedy action) in the action value function Q in the state s provided with the independent variable and also determines a rule of selecting another action a at a predetermined probability.

More specifically, in the present embodiment, the number of possible values of the independent variable in the action value function Q is such that some of all combinations of possible values of the state s and the action a are eliminated based on human knowledge or the like.

Figure 3:
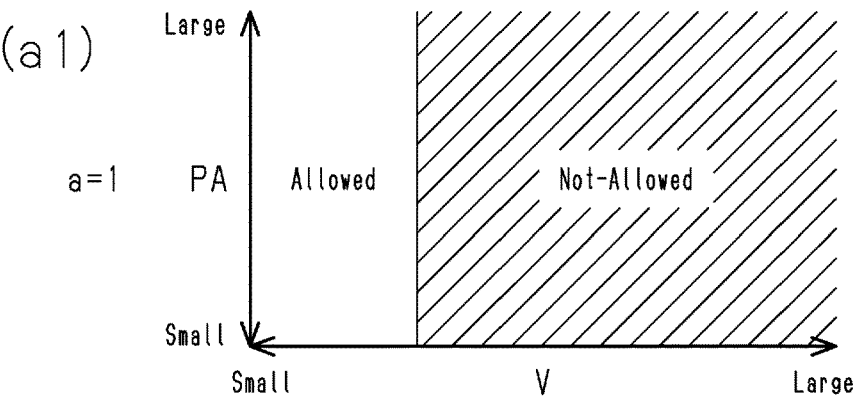
FIG. 3 includes diagrams illustrating relationship specifying data in the first embodiment.
Figure 3:
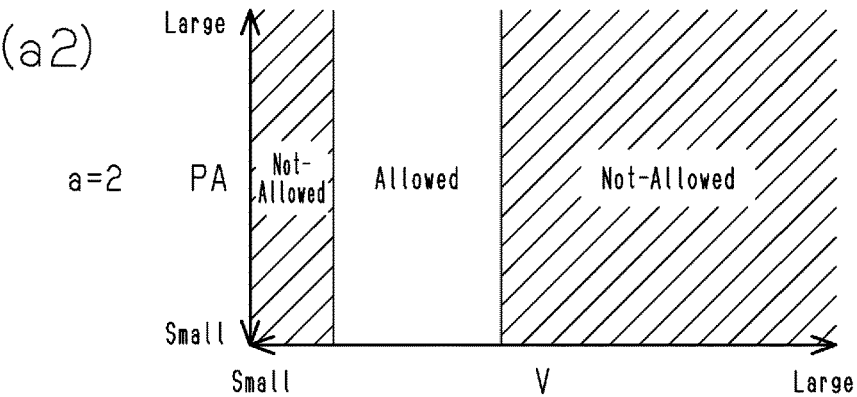
Figure 3:
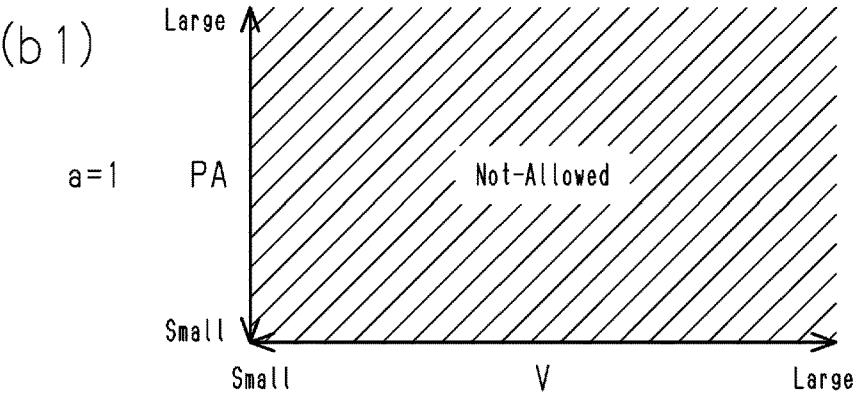
Figure 3:
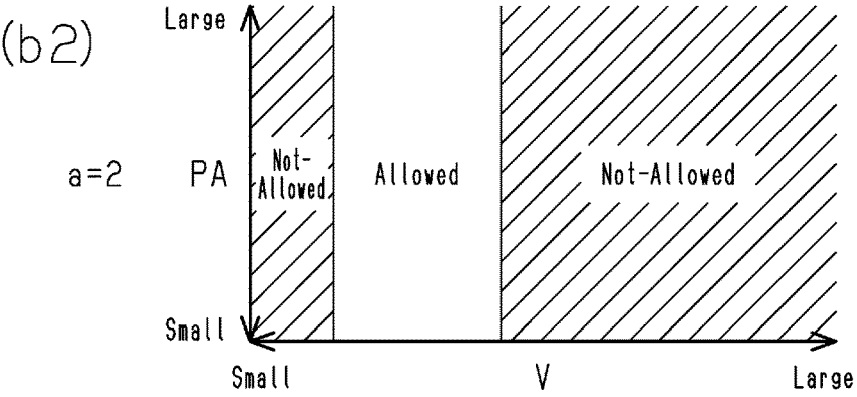

FIG. 3 shows part of the action value function Q of the present embodiment. In (a1) of FIG. 3, when the present transmission ratio GR corresponds to the second speed, "allowed" indicates a region in which the first speed is achievable as the action a in accordance with the accelerator operation amount PA and the vehicle speed V, and "not-allowed" indicates a region in which the first speed is not achievable. In (a1) of FIG. 3, the action a indicating the first speed is expressed as "a=1." In (a1) of FIG. 3, the first speed is achievable as the action a in only a region in which the vehicle speed V is low. In the region indicated by "not-allowed," a value of the action variable a is not defined in the relationship specifying data DR.

In (a2) of FIG. 3, when the present transmission ratio GR corresponds to the second speed, "allowed" indicates a region in which the second speed is achievable as the action a in accordance with the accelerator operation amount PA and the vehicle speed V, and "not-allowed" indicates a region in which the second speed is not achievable. In (a2) of FIG. 3, the action a indicating the second speed is expressed as "a=2." As shown in (a2) of FIG. 3, the region in which the second speed is achievable as the action a partially overlaps the region in which the first speed is achievable and includes a region with higher vehicle speeds V.

(b1) of FIG. 3 shows the region in which the first speed is achievable as the action a in accordance with the accelerator operation amount PA and the vehicle speed V when the present transmission ratio GR corresponds to the third speed. As shown in (b1) of FIG. 3, in this case, there is no region in which the first speed is achievable as the action a.

In (b2) of FIG. 3, when the present transmission ratio GR corresponds to the third speed, "allowed" indicates a region in which the second speed is achievable as the action a in accordance with the accelerator operation amount PA and the vehicle speed V, and "not-allowed" indicates a region in which the second speed is not achievable.

The above setting does not allow the transmission ratio to be changed in a skipping manner, which is, for example, from the third speed to the first speed.

Referring again to FIG. 2, the CPU 72 outputs an operating signal MS5 to operate the transmission 60 based on the transmission ratio GR set in S16 (S18). The CPU 72 obtains a rotation speed NE of the internal combustion engine 10 (S20). The CPU 72 calculates the rotation speed NE based on the output signal Scr of the crank angle sensor 84. The CPU 72 determines whether a predetermined period has elapsed from the later one of the point in time when the series of the processes shown in FIG. 2 started for the first time or the point in time when S24 (described later) is executed (S22). If it is determined that the predetermined period has elapsed (S22: YES), the CPU 72 updates the action value function Q through reinforcement learning (S24).

Figure 4:
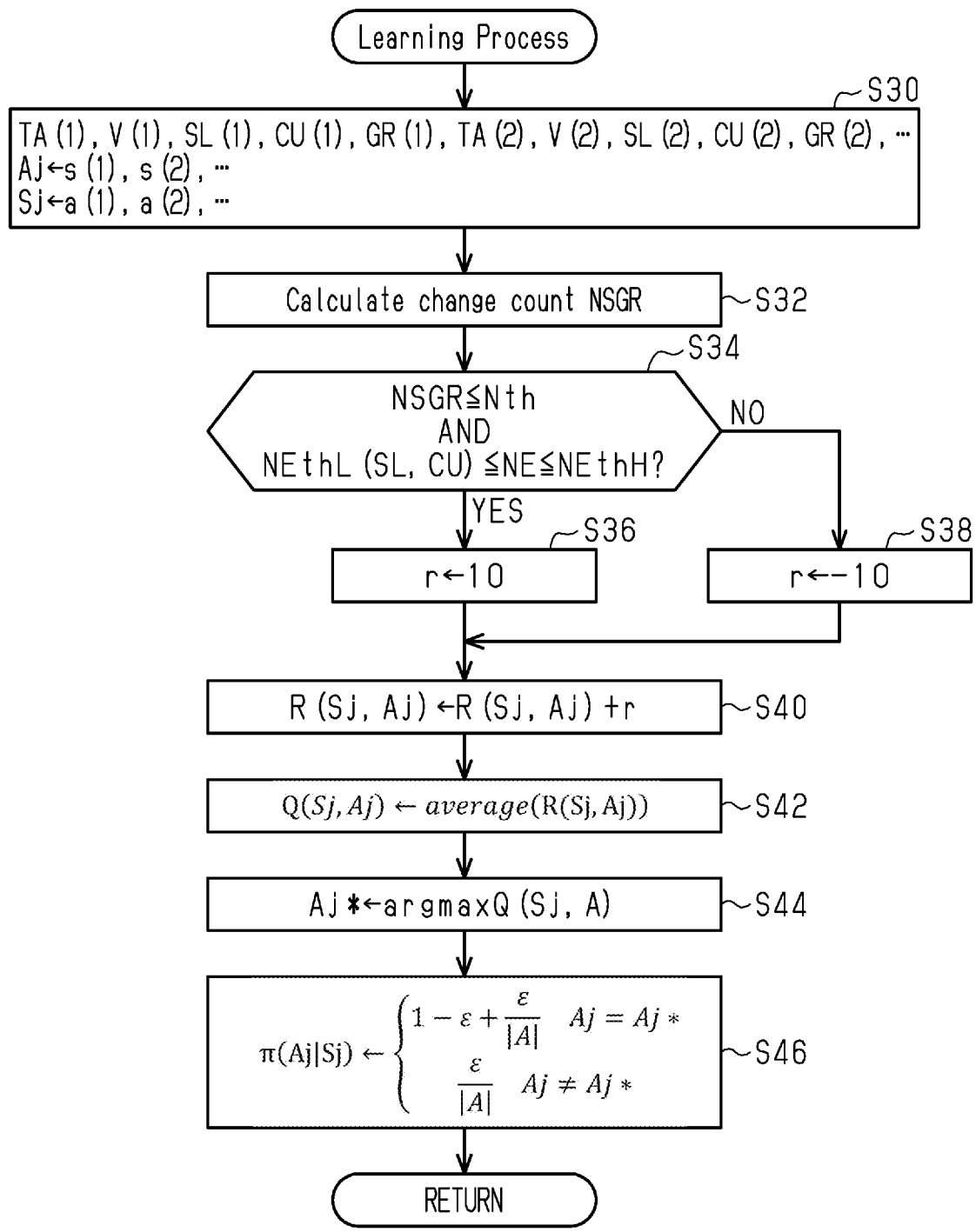
FIG. 4 is a flowchart showing details of a learning process in the first embodiment.

FIG. 4 shows details of the process of S24.

In a series of the processes shown in FIG. 4, the CPU 72 obtains time series data of the state s and the action a in the above-described predetermined period (S30). In FIG. 4, elements having different numerals in parentheses indicate values of a variable sampled at different times. For example, the throttle opening degree TA(1) and the throttle opening degree TA(2) are sampled at different times. Time series data of the action a in a predetermined period is defined as an action set Aj. Time series data of the state s in the predetermined period is defined as a state set Sj.

The CPU 72 calculates a change count NSGR, which is the number of times the transmission ratio has been changed, based on time series data of the transmission ratio GR in the state set Sj (S32). The CPU 72 determines whether the logical conjunction of conditions (A) and (B) is true (S34). Condition (A) indicates that the change count NSGR is less than or equal to a predetermined number of times Nth. Condition (B) indicates that all of the sampling values of the rotation speed NE in the predetermined period are greater than or equal to a lower limit speed NEthL and less than or equal to an upper limit speed NEthH. In the present embodiment, the logical conjunction being true corresponds to a required criterion related to drivability being met.

The CPU 72 variably sets the lower limit speed NEthL based on the gradient SL and the curvature CU. More specifically, when the gradient SL is relatively large, the CPU 72 sets the lower limit speed NEthL to a larger value than when the gradient SL is relatively small. Also, when the curvature CU is relatively large, the CPU 72 sets the lower limit speed NEthL to a larger value than when the curvature CU is relatively small.

If it is determined that the logical conjunction is true (S34: YES), the CPU 72 assigns "10" to a reward r (S36). If it is determined that the logical conjunction is false (S34: NO), the CPU 72 assigns "−10" to the reward r (S38). When the process of S36 or S38 is completed, the CPU 72 updates the relationship specifying data DR stored in the storage device 76 shown in FIG. 1. In the present embodiment, an ε-soft on-policy Monte Carlo method is used.

More specifically, the CPU 72 adds the reward r to each return R(Sj, Aj) determined by a combination of each state and the corresponding action retrieved in S30 (S40). "R(Sj, Aj)" collectively refers to a return R when one of the elements in the state set Sj is used as the state and one of the elements in the action set Aj is used as the action. The returns R(Sj, Aj) determined by combinations of each state and the corresponding action retrieved in S30 are averaged, and the average is assigned to the corresponding action value function Q(Sj, Aj) (S42). The averaging may be a process that divides the return R calculated in S40 by a value obtained by adding a predetermined number to the number of times S40 was executed. The initial value of the return R may be the initial value of the corresponding action value function Q.

For each state retrieved in S30, the CPU 72 assigns the action a corresponding to the maximum value in the corresponding action value function Q(Sj, A) to an action Aj* (S44). In this description, "A" indicates any possible action. Although the action Aj* has different values in accordance with the type of state retrieved in S40, the presentation is simplified and indicated by the same symbol.

For each state retrieved in S30, the CPU 72 updates the corresponding policy π(Aj|Sj) (S46). More specifically, when the total number of actions is denoted by "|A|," the selection probability of the action Aj* selected by S44 is expressed as "(1−ε)+ε/|A|." The selection probability of each action other than the action Aj* is expressed as "ε/|A|." The number of actions other than the action Aj* is "|A|−1." The process of S46 is based on the action value function Q that is updated in S42. Thus, the relationship specifying data DR, which specifies the relationship between the state s and the action a, is updated to increase the return R.

When the process of S46 is completed, the CPU 72 temporarily ends the series of the processes shown in FIG. 4.

Referring again to FIG. 2, when the process of S24 is completed or a negative determination is made in S22, the CPU 72 temporarily ends the series of the processes shown in FIG. 2. The processes of S10 to S22 are implemented by the CPU 72 executing the control program 74a. The process of S24 is implemented by the CPU 72 executing the learning program 74b. At the shipment of the vehicle VC1, the relationship specifying data DR includes data that has been learned by executing the same process shown in FIG. 2 at a test bench.

The operation and advantages of the present embodiment will now be described.

The CPU 72 sets the action a, that is, the transmission ratio GR that is to be achieved in the present control cycle, in accordance with the policy π based on the accelerator operation amount PA, the vehicle speed V, the gradient SL, the curvature CU, and the present transmission ratio GR. Basically, the CPU 72 selects the action a that maximizes the expected return based on the action value function Q specified in the relationship specifying data DR. In addition, the CPU 72 selects an action other than the action a maximizing the expected return at a predetermined probability "ε−ε/|A|" to explore the action a maximizing the expected return. As a result, as the user drives the vehicle VC1, the relationship specifying data DR is updated through reinforcement learning. Thus, the transmission ratio Gr, which needs to be updated in accordance with the accelerator operation amount PA, the vehicle speed V, the gradient SL, the curvature CU, and the present transmission ratio GR, is set to a value appropriate for traveling of the vehicle VC1 without overly increasing the amount of work performed by one skilled in the art.

For example, when the present transmission ratio corresponds to the second speed, an attempt to switch to the fourth speed as exploration would result in a sudden change in the transmission ratio. In the present embodiment, such switching is not desirable. In this regard, as illustrated in FIG. 3, the action a that is defined in the action value function Q is limited in advance so that such transmission will not be performed by exploration. This limits inappropriate operation of the transmission ratio.

The present embodiment described above further obtains the following operation and advantages.

(1) The transmission ratio GR is determined based on the gradient SL and the curvature CU in addition to the accelerator operation amount PA and the vehicle speed V. There is a tendency that when the gradient SL is relatively large, the drive wheels 66 are required to output a greater torque than when the gradient SL is relatively small. There is a tendency that when traveling along a curve, switching between accelerating operation and braking operation are performed more frequently than when traveling straight ahead. Therefore, an appropriate transmission ratio may differ in accordance with the gradient SL and the curvature CU. In the present embodiment, the transmission ratio GR is set in accordance with the gradient SL and the curvature CU, so that the transmission ratio GR is set more appropriately. However, when the transmission ratio GR is set based on the gradient SL and the curvature CU, the number of man-hours for adaptation is increased as compared to when the transmission ratio GR is set based on only the accelerator operation amount PA and the vehicle speed V. Thus, as in the present embodiment, use of reinforcement learning particularly has a great merit.

Second Embodiment

A second embodiment will now be described with reference to the drawings. The differences from the first embodiment will mainly be discussed.

Figure 5:
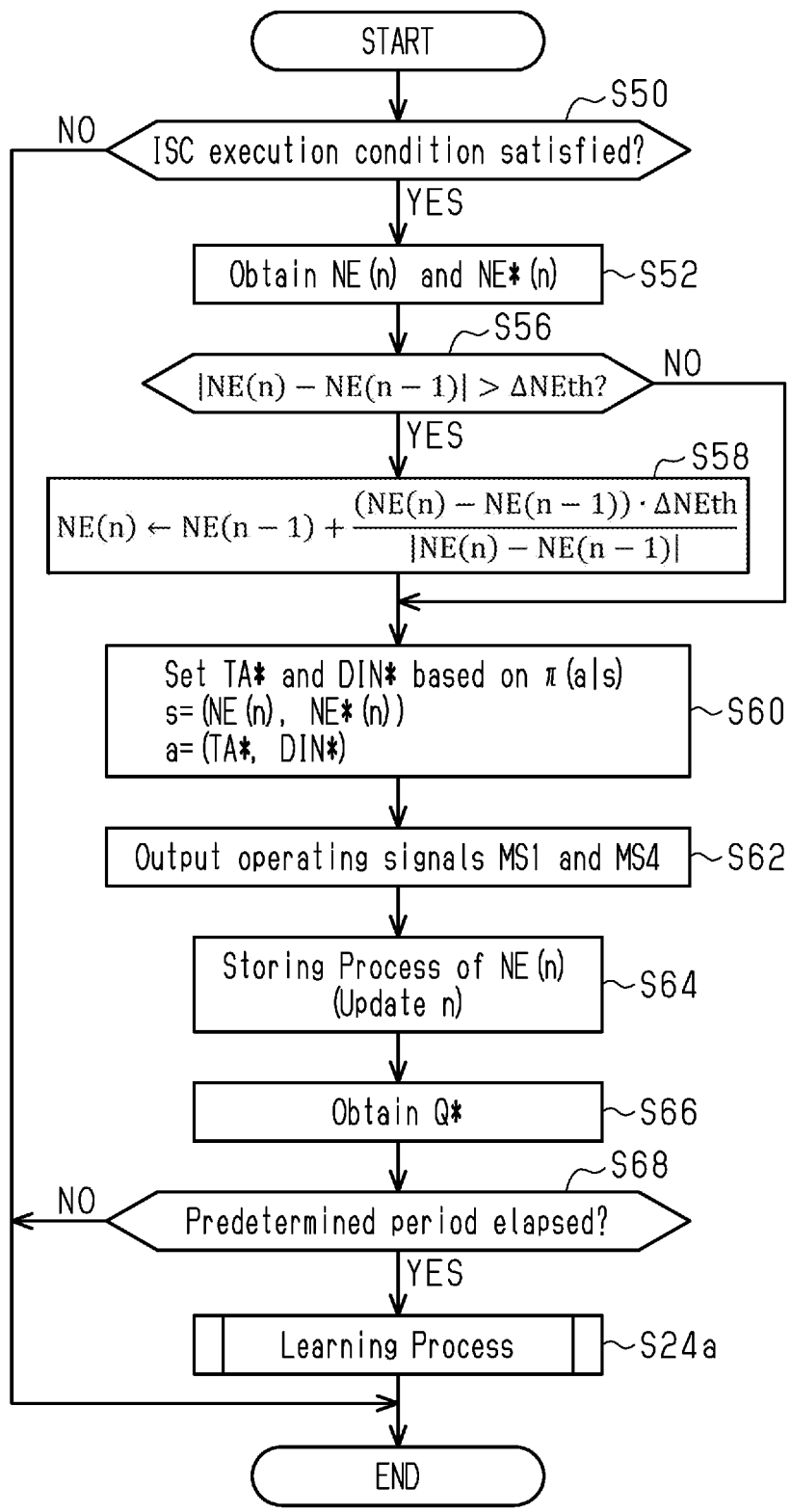
FIG. 5 is a flowchart showing the procedures of a process executed by the controller in a second embodiment.

FIG. 5 shows the procedures of a process executed by the controller 70 in the present embodiment. The process shown in FIG. 5 is implemented by the CPU 72, for example, repeatedly executing the control program 74a and the learning program 74b stored in the ROM 74 in a predetermined cycle.

In a series of the processes shown in FIG. 5, the CPU 72 first determines whether a condition for executing an idling rotation speed control is satisfied (S50). This execution condition may be that, for example, the logical conjunction of the accelerator operation amount PA being zero and the rotation speed NE being less than or equal to a predetermined value is true.

If it is determined that the execution condition is satisfied (S50: YES), the CPU 72 obtains the rotation speed NE and a target rotation speed NE* as the state s (S52). For example, when a relatively large shaft torque is requested to the internal combustion engine 10, the CPU 72 may calculate the target rotation speed NE* to be a greater value than when a relatively small shaft torque is requested.

The CPU 72 determines whether an absolute value of a difference between a previous rotation speed NE(n−1) used in S60 (described later) and the rotation speed NE(n) obtained in S52 of the present cycle is greater than a predetermined value ΔNEth (S56). The predetermined value ΔNEth is set to be a value greater than the assumed maximum value of an amount of the rotation speed NE changed in a cycle of the series of the processes shown in FIG. 5. If it is determined that the absolute value is greater than the predetermined value ΔNEth, the CPU 72 executes a guard process of the rotation speed NE(n) so that the absolute value of a change amount of the rotation speed NE(n) obtained in S52 of the present cycle from the previous rotation speed NE(n−1) used in S60 becomes the predetermined value ΔNEth (S58).

When the process of S58 is completed or a negative determination is made in S56, the CPU 72 sets the action a including an intake phase difference instruction value DIN* and a throttle opening degree instruction value TA* corresponding to the state s obtained in S52 in accordance with the policy π determined by the relationship specifying data DR (S60). When the process of S58 is executed, the rotation speed NE(n) in the state s obtained in S52 is corrected to a value that has undergone the guard process in S58, and the corrected value is used in S60.

In the present embodiment, the relationship specifying data DR determines the action value function Q and the policy π. In the present embodiment, the action value function Q is a table-type function indicating values of expected return corresponding to a quantic independent variable of the state s and the action a. When the state s is given, the policy π gives priority to selecting the maximum action a (greedy action) in the action value function Q in the state s provided with the independent variable and also determines a rule of selecting another action a at a predetermined probability.

The CPU 72 outputs an operating signal MS1 to the throttle valve 14 to operate the throttle opening degree TA based on the throttle opening degree instruction value TA* and the intake phase difference instruction value DIN* that has been set, and outputs an operating signal MS4 to the intake valve timing variable device 44 to feedback-control an intake phase difference DIN (S62). The intake phase difference DIN is calculated by the CPU 72 based on the output signal Scr of the crank angle sensor 84 and the output signal Sca of the cam angle sensor 85.

The CPU 72 stores the present rotation speed NE(n) in the storage device 76 and then updates a variable n (S64). Thus, the rotation speed NE that is stored by the process of S64 in the present cycle will be retrieved as the previous rotation speed NE(n−1) in the process of S56 in the next control cycle. The CPU 72 obtains an injection amount instruction value Q* (S66). The injection amount instruction value Q* is calculated by the CPU 72 as a fuel amount needed, for example, to control the detection value Afu to a target value.

The CPU 72 determines whether a predetermined period has elapsed from the later one of the point in time when a negative determination was switched to an affirmative determination in S50 and the point in time when S24a (described later) is executed (S68). If it is determined that the predetermined period has elapsed (S68: YES), the CPU 72 updates the relationship specifying data DR (S24a).

Figure 6:
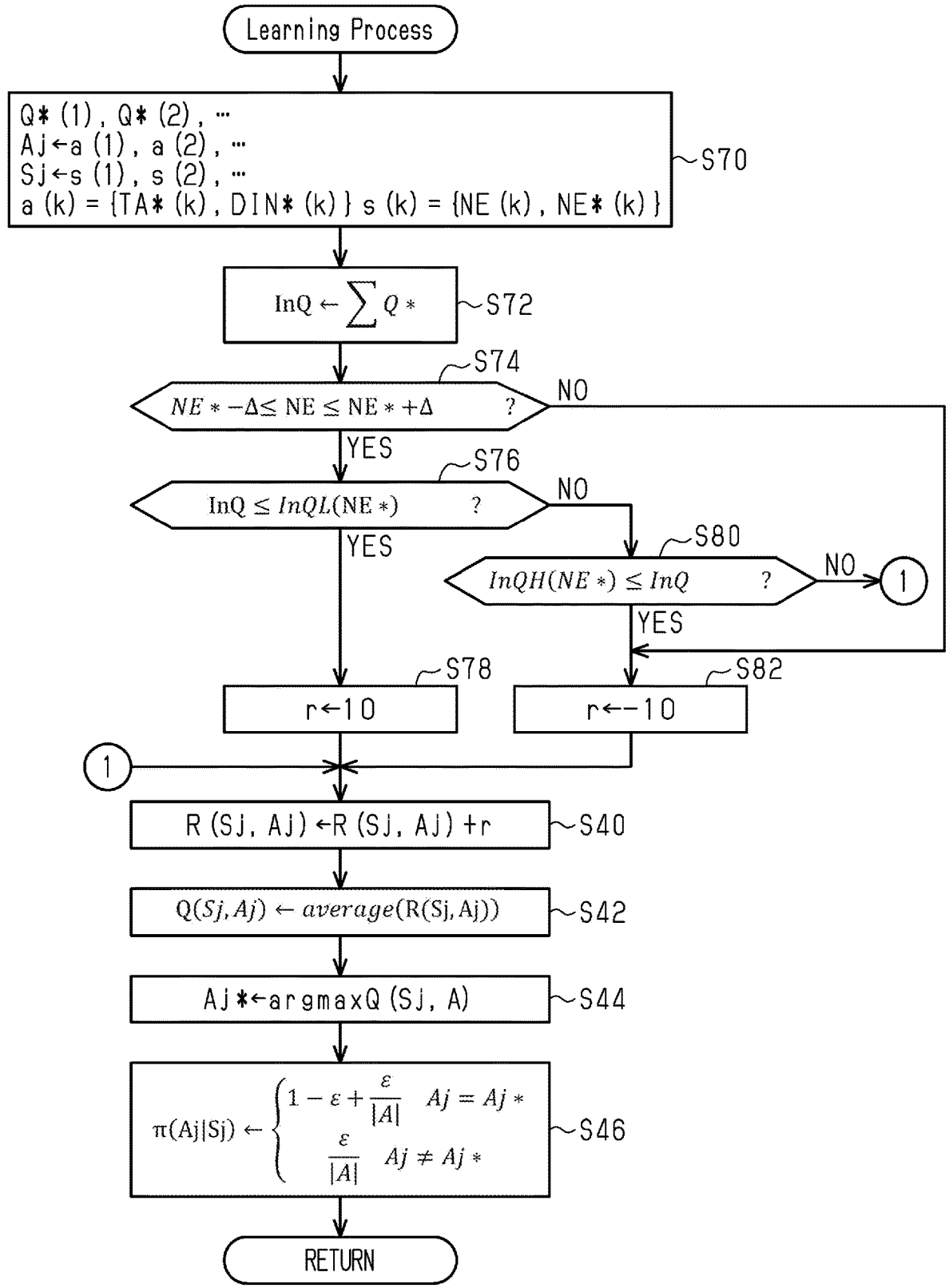
FIG. 6 is a flowchart showing details of a learning process in the second embodiment.

FIG. 6 shows details of the process of S24a.

In a series of the processes shown in FIG. 6, the CPU 72 first obtains time series data of the injection amount instruction value Q* and time series data of the state s and the action a in a predetermined period (S70). The CPU 72 calculates an accumulated value InQ of the time series data of the injection amount instruction value Q* (S72).

The CPU 72 determines whether condition (F) is satisfied (S74). Condition (F) indicates that an absolute value of a difference between the rotation speed NE and the target rotation speed NE* in the predetermined period is less than or equal to a predetermined value Δ. If it is determined that condition (F) is satisfied (S74: YES), the CPU 72 determines whether condition (G) is satisfied (S76). Condition (G) indicates that the accumulated value InQ is less than or equal to a highly efficient threshold value InQL. The CPU 72 variably sets the highly efficient threshold value InQL in accordance with the target rotation speed NE*. More specifically, when the target rotation speed NE* is relatively high, the CPU 72 sets the highly efficient threshold value InQL to a greater value than when the target rotation speed NE* is relatively low. If it is determined that condition (G) is satisfied (S76: YES), the CPU 72 assigns "10" to the reward r (S78).

If it is determined that the accumulated value InQ is greater than the highly efficient threshold value InQL (S76: NO), the CPU 72 determines whether condition (H) is satisfied (S80). Condition (H) indicates that the accumulated value InQ is greater than or equal to a low efficient threshold value InQH. The CPU 72 variably sets the low efficient threshold value InQH in accordance with the target rotation speed NE*. More specifically, when the target rotation speed NE* is relatively high, the CPU 72 sets the low efficient threshold value InQH to a greater value than when the target rotation speed NE* is relatively low. When it is determined that condition (H) is satisfied (S80: YES) or a negative determination is made in S74, the CPU 72 assigns "−10" to the reward r (S82).

The processes of S76 to S82 assign a greater reward when the energy usage efficiency is relatively high than when relatively low.

When the process of S78 or S82 is completed or a negative determination is made in S80, the CPU 72 changes the action a and the state s for the process shown in FIG. 3 and executes the processes of S40 to S46 in the same manner as the process shown in FIG. 3 to update the relationship specifying data DR stored in the storage device 76 shown in FIG. 1. When the process of S46 is completed, the CPU 72 temporarily ends the series of the processes shown in FIG. 6.

Referring again to FIG. 5, when the process of S24a is completed or a negative determination is made in S50 or S68, the CPU 72 temporarily ends the series of the processes shown in FIG. 5. The processes of S50 to S68 are implemented by the CPU 72 executing the control program 74a. The process of S24a is implemented by the CPU 72 executing the learning program 74b. At the shipment of the vehicle VC1, the relationship specifying data DR includes data that has been learned by executing the same processes shown in FIG. 5 at a test bench.

The operation and advantages of the present embodiment will now be described.

Under the idling rotation speed control, the CPU 72 controls the rotation speed NE to the target rotation speed NE* using the intake phase difference DIN as an operation amount in addition to the throttle opening degree TA. With this configuration, the control reduces the fuel consumption amount as compared to a configuration that executes the idling rotation speed control at a fixed intake phase difference instruction value DIN*. However, addition of the intake phase difference instruction value DIN* to the operation amount increases the number of man-hours for the adaptation. In this regard, in the present embodiment, the idling rotation speed control is executed using the relationship specifying data DR that is learned through reinforcement learning.

In addition, the CPU 72 sets the action a including the throttle opening degree instruction value TA* and the intake phase difference instruction value DIN* in accordance with the policy π. Basically, the CPU 72 selects the action a that maximizes the expected return based on the action value function Q specified in the relationship specifying data DR. In addition, the CPU 72 selects an action other than the action a maximizing the expected return at a predetermined probability "ε−ε|A|" to explore the action a maximizing the expected return. Thus, the relationship specifying data DR is updated by reinforcement learning to appropriate data that reflects individual differences and aging deterioration of the internal combustion engine 10.

In addition, in the present embodiment, the change amount of the present rotation speed NE(n), which is an input to the action value function Q, from the previous rotation speed NE(n−1) is limited to the predetermined value ΔNEth or less. Since the predetermined value ΔNEth is greater than the assumed maximum value of the change amount of the rotation speed NE in the control cycle of the process shown in FIG. 5, if the change amount of the present rotation speed NE(n) from the previous rotation speed NE(n−1) is greater than the predetermined value ΔNEth, it is considered that the present rotation speed NE(n) is different from the actual rotation speed NE due to noise or the like. In this regard, the limitation to the predetermined value ΔNEth or less avoids a situation in which the throttle opening degree instruction value TA* and the intake phase difference instruction value DIN* are set based on an abnormal rotation speed NE(n). This particularly restricts sudden changes in the throttle opening degree instruction value TA* and the intake phase difference instruction value DIN*. More specifically, when the absolute value of the difference between the previous rotation speed NE(n−1) and the present rotation speed NE(n) is overly large, it is considered that the greedy action greatly differs between the previous cycle and the present cycle. Therefore, when the greedy action is selected in both the previous cycle and the present cycle, if the absolute value of the difference between the previous rotation speed NE(n−1) and the present rotation speed NE(n) is overly large, the throttle opening degree instruction value TA* and the intake phase difference instruction value DIN* may suddenly change.

Third Embodiment

A third embodiment will now be described with reference to the drawings. The differences from the first embodiment will mainly be discussed.

In the present embodiment, a policy gradient method is used as reinforcement learning.

In the present embodiment, reinforcement learning is executed so that the throttle opening degree instruction value TA*, an ignition timing retardation amount aop, and a base injection amount Qbse are used as general action variables that are not limited to the idling rotation speed control. The retardation amount aop is an amount of retardation from a predetermined reference ignition timing. The reference ignition timing is the more retarded one of the minimum advance for the best torque (MBT) ignition timing and the knock limit point. The MBT ignition timing is the ignition timing at which the maximum torque is obtained (maximum torque ignition timing). The knock limit point is the advance limit value of the ignition timing at which knocking is restrained within an allowable level under the assumed best condition using a fuel with a high octane number, which has a high knock limit. The base injection amount Qbse is an open-loop operation amount used to control the detection value Afu to a target value.

Figure 7:
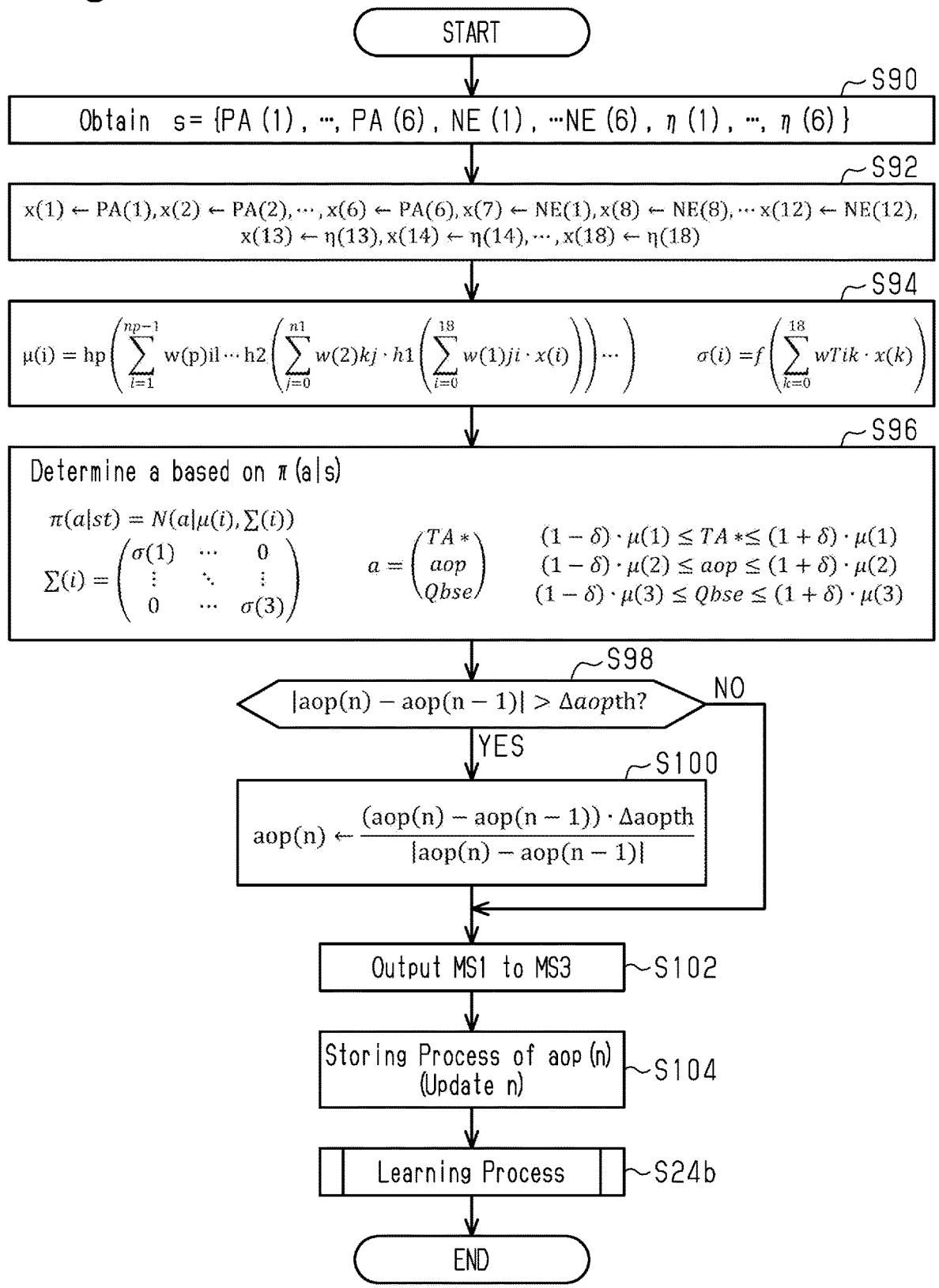
FIG. 7 is a flowchart showing the procedures of a process executed by the controller in a third embodiment.

FIG. 7 shows the procedures of a process executed by the controller 70 in the present embodiment. The process shown in FIG. 7 is implemented by the CPU 72, for example, repeatedly executing the control program 74a and the learning program 74b stored in the ROM 74 in a predetermined cycle.

In a series of the processes shown in FIG. 7, the CPU 72 first obtains time series data of the accelerator operation amount PA, the rotation speed NE, and a charging efficiency η as the state s (S90). In the present embodiment, each of the accelerator operation amount PA, the rotation speed NE, and the charging efficiency η has six values that are sampled at equal intervals.

The CPU 72 assigns the state s to input variables of a function approximator that determines the policy π (S92). More specifically, the CPU 72 assigns the accelerator operation amount PA(i) to an input variable x(i), assigns the rotation speed NE(i) to an input variable x(6+i), and assigns the charging efficiency η(i) to an input variable x(12+i), where i=1 to 6.

The CPU 72 assigns input variables x(1) to x(18) to the function approximator that determines the policy (S94). In the present embodiment, the policy π is a multivariate Gaussian distribution that determines the probability of each operation amount determining the action. In the multivariate Gaussian distribution, an average value μ(1) indicates an average value of the throttle opening degree instruction value TA*, an average value μ(2) indicates an average value of the retardation amount aop, and an average value μ(3) indicates an average value of the base injection amount Qbse. In the present embodiment, a covariance matrix of the multivariate Gaussian distribution is a diagonal matrix, and variances σ(i) corresponding to each average value μ(i) may have different values.

In the present embodiment, the average values μ(i) are configured by a neural network including "p−1" intermediate layers. In the neural network, activation functions h1 to hp−1 of the intermediate layers are hyperbolic tangents, and an activation function hp of an output layer is a rectified linear unit (ReLU). The ReLU is a function that outputs a non-lesser one of the input and zero. When m=2, 3, . . . , p, the value of each node in the (m−1)th intermediate layer is generated by inputting an output of a linear mapping specified by a coefficient w(m) to the activation function hm. Here, n1, n2, . . . , np−1 are the number of nodes in the first, second, . . . , the (p−1)th intermediate layers, respectively. For example, the value of each node in the first intermediate layer is generated by inputting the input variables x(1) to x(18) to a linear mapping specified by coefficient w(1)ji (j=0 to n1, i=0 to 18) to obtain an output and inputting the output to the activation function h. In this case, w(1)j0 is one of the bias parameters, and an input variable x(0) is defined as one.

In the neural network described above, each of the three outputs of the activation function hp is the average value μ(i).

In the present embodiment, the variance σ(i) is a value of function f that is obtained by linearly converting the input variables x(1) to x(18) through a linear mapping specified by coefficient wTik (i=1 to 3, k=1 to 18) and inputting each linearly converted value to function f. In the present embodiment, ReLU is used as function f.

The CPU 72 determines the action a based on the policy π specified by the average value μ(i) and the variance σ(i) calculated in S94 (S96). In this case, the probability of selecting the average value μ(i) is the highest. In addition, when the variance σ(i) is relatively small, the probability of selecting the average value μ(i) is higher than when the variance σ(i) is relatively large.

In the present embodiment, the greedy action is considered to be an action corresponding to the average value μ(i), and the absolute value of the difference between the value of each variable of the action a that may be taken by exploration and the value of each variable of the greedy action is limited to a predetermined value δ or less. More specifically, when the probability distribution of the policy π is the multivariate Gaussian distribution, the probability of an action a having a value that greatly deviates from the average value μ(i) is extremely low but does not become zero. That is, there is the possibility that the action a having a value that greatly deviates from the average value μ(i) is designated by the relationship specifying data DR. Even at a low probability, it is not desirable that the extreme action a is taken by exploration. Hence, the absolute value of the difference from the greedy action is limited to the predetermined value δ or less. This corresponds to prohibition of use of an action a when the selection probability determined by the value of the policy π is less than a predetermined value.

The CPU 72 determines whether the absolute value of the difference between the present retardation amount aop(n) set in S96 and the previous retardation amount aop(n−1) used in S102 (described later) is greater than a predetermined value Δaopth (S98). If it is determined that the absolute value is greater than the predetermined value Δaopth (S98: YES), the CPU 72 executes a guard process of the retardation amount aop(n) so that the absolute value of the difference from the previous retardation amount aop(n−1) used in S102 becomes the predetermined value Δaopth (S100). More specifically, the CPU 72 executes the guard process on the retardation amount aop designated by the relationship specifying data DR.

When the process of S100 is completed or a negative determination is made in S98, the CPU 72 outputs an operating signal MS1 to the throttle valve 14, outputs an operating signal MS3 to the ignition device 26, and outputs an operating signal MS2 to the fuel injection valve 16 (S102). More specifically, the CPU 72 outputs the operating signal MS1 to feedback-control the throttle opening degree TA to the throttle opening degree instruction value TA*. Also, the CPU 72 outputs the operating signal MS3 to control the ignition timing to a value of the reference ignition timing retarded by the retardation amount aop and feedback-corrected through knocking control. The reference ignition timing is variably set by the CPU 72 in accordance with the rotation speed NE of the crankshaft 28 and the charging efficiency η. The charging efficiency η is calculated by the CPU 72 based on the rotation speed NE and the intake air amount Ga. Also, the CPU 72 outputs the operating signal MS2 based on a value of the base injection amount Qbse that is corrected using a feedback correction coefficient, that is, an operation amount used to feedback-control the detection value Afu to a target value Afu*.

The CPU 72 stores the retardation amount aop used in S102 in the storage device 76 and updates the variable n (S104). Thus, the retardation amount aop that is stored in S104 of the present cycle will be retrieved as the previous retardation amount aop(n−1) in S98 of the next cycle.

The CPU 72 executes a process that updates the relationship specifying data DR (S24b) and temporarily ends the series of the processes shown in FIG. 7.

Figure 8:
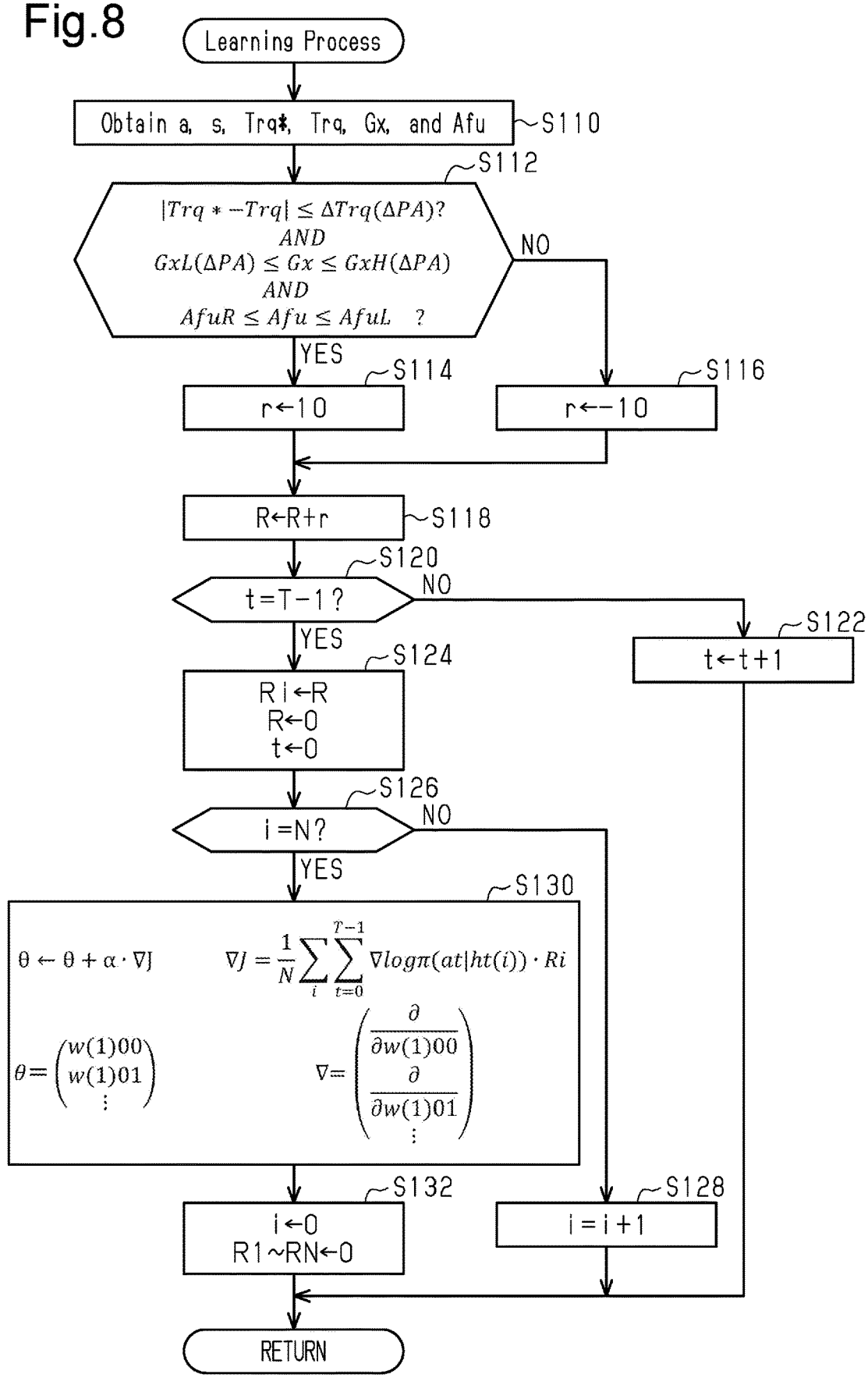
FIG. 8 is a flowchart showing details of a learning process in the third embodiment.

FIG. 8 shows details of the process of S24b.

The CPU 72 obtains a torque instruction value Trq*, a torque Trq, the acceleration rate Gx, and the detection value Afu in addition to the action a and the state s (S110). The CPU 72 calculates the torque Trq by inputting the rotation speed NE, the charging efficiency η, and the ignition timing to a torque output mapping specified by the torque output mapping data DT. The CPU 72 sets the torque instruction value Trq* in accordance with the accelerator operation amount PA.

The CPU 72 determines whether the logical conjunction of the following conditions (K) to (M) is true (S112).

Condition (K) indicates that the absolute value of the difference between the torque Trq and the torque instruction value Trq* is less than or equal to a specified amount ΔTrq.

Condition (L) indicates that the acceleration rate Gx is greater than or equal to a lower limit value GxL and less than or equal to an upper limit value GxH.

Condition (M) indicates that the detection value Afu is greater than or equal to a rich threshold value AfR and less than or equal to a lean threshold value AfL.

If it is determined that the logical conjunction is true (S112: YES), the CPU 72 assigns "10" to the reward r (S114). If it is determined that the logical conjunction is false (S112: NO), the CPU 72 assigns "−10" to the reward r (S116). The processes of S112 to S116 assign a greater reward when the drivability meets a criterion than when it does not meet the criterion and assign a greater reward when an emission property meets a criterion than when it does not meet the criterion. When the process of S114 or S116 is completed, the CPU 72 adds the reward r to the return R (S118).

The CPU 72 determines whether a variable t has reached a predetermined time T−1 (S120). If it is determined that the variable t has not reached the predetermined time T−1 (S120: NO), the CPU 72 increments the variable t (S122).

If it is determined that the variable t has reached the predetermined time T−1 (S120: YES), the CPU 72 assigns the return R to return Ri and then initializes the return R and the variable t (S124). The CPU 72 determines whether a variable i has reached a predetermined value N (S126). If it is determined that the variable i has not reached the predetermined value N (S126: NO), the CPU 72 increments the variable i (S128).

If it is determined that the variable i has reached the predetermined value N (S126: YES), the CPU 72 updates a coefficient wT and variables w(1) to w(p) that specify the policy π using the policy gradient method (S130). In FIG. 8, the coefficient wT and the variables w(1) to w(p) specifying the policy π are collectively referred to as a parameter θ.

With each variable t changing from 0 to T−1, a set of the state s, the action a, and the reward r is referred to as a trajectory ht, and a probability that the trajectory ht is obtained in accordance with the policy π specified by the parameter θ is referred to as a probability pθ(ht). The number of sets is T. The integral value of "pθ(ht)·Rt" with the trajectory ht is an expected value (expected return J) of the return R(ht). The parameter θ is updated to maximize the expected value. This is achieved when an update amount of each component in the parameter θ is proportional to a value obtained by partially differentiating the expected return J with the component.

The probability pθ(ht) will be expressed as follows using states s0, s1, sT, and actions a0, a1, . . . aT.

$$p\theta(ht)=p(s0)\cdot p(s1|s0,a0)\cdot \pi(a0|s0)\cdot p(s2|s1,a1)\cdot \pi(a1|s1) \ldots p(sT|sT-1,aT-1)\cdot \pi(aT-1|sT-1)$$

The initial probability p(s0) is a probability that the state s0 is obtained. A transition probability p(st+1|st,at) is a probability of transitioning from the state st to the state st+1 with the state st and the action at.

Thus, the partial differential of the expected return J is expressed with the following equation (c1).

$$\nabla J = \nabla \int p\theta(ht)\cdot R(ht)dht = \int R(ht)p\theta(ht)\nabla \log p\theta(ht)dht = \int R(ht)p\theta(ht)\sum_{t=0}^{T-1}\nabla \log \pi(at\,|\,st)dht \qquad (c1)$$

Since the probability pθ(ht) is unknown, the integral of equation (c1) is replaced with an average value of trajectories ht (here, the number of trajectories ht is the predetermined value N).

Thus, the partial differential of each component in the parameter θ of the expected return J is a value obtained as follows. The product of the return Ri and a sum of partial differential coefficients, with respect to the corresponding component of the parameter θ, of a logarithm of the policy π(at|st) with "t=0 to T−1" is add for the returns Ri, the number of which is the predetermined value N, and then divided by the predetermined value N.

The CPU 72 obtains a value by multiplying the partial differential coefficient of the expected return J with respect to each component of the parameter θ by a learning ratio α and uses the obtained value as an update amount of the corresponding component of the parameter θ.

The processes of S118 to S130 are implemented by executing an instruction to execute an updating mapping that inputs the states s0, s1, . . . , the actions a0, a1, . . . , and the reward r in the learning program 74b stored in the ROM 74 to output an updated parameter θ.

When the process of S130 is completed, the CPU 72 initializes the variable i and the returns R1 to RN (S132).

When the process of S122, S128, or S132 is completed, the CPU 72 temporarily ends the series of the processes shown in FIG. 8.

The operation and advantages of the present embodiment will now be described.

The CPU 72 sets the throttle opening degree instruction value TA*, the retardation amount aop, and the base injection amount Qbse in accordance with the policy π based on the time series data of the accelerator operation amount PA, the rotation speed NE, and the charging efficiency η. During transition, if the base injection amount Qbse, which is an open loop operation amount, is merely set to a value proportional to the charging efficiency η, the detection value Afu may be outside the range between the rich threshold value AfR and the lean threshold value AfL. Then, when a person skilled in the art repeats trial and error to set the base injection amount Qbse, the amount of work performed by the person will be increased. In this regard, in the present embodiment, the base injection amount Qbse, which is an injection amount of an open loop control during transition, is learned through reinforcement learning. This decreases the amount of work performed by a person skilled in the art.

When setting the throttle opening degree instruction value TA*, the retardation amount aop, and the base injection amount Qbse based on the policy π, the CPU 72 limits the absolute value of a difference from the value indicated by the greedy action to the predetermined value δ or less. This reduces use of a value that is overly inappropriate for exploration. In addition, the CPU 72 limits the absolute value of a difference between the retardation amount aop(n) used to set the ignition timing of the present cycle and the retardation amount aop(n−1) used to set the previous ignition timing to the predetermined value Δaopth or less. This restricts sudden changes in the ignition timing.

The present embodiment described above further has the following advantages.

(2) Use of the function approximator for the relationship specifying data DR facilitates the handling of the relationship specifying data DR even when states and actions are continuous variables.

(3) The independent variables of the action value function Q include time series data of the accelerator operation amount PA. Thus, the value of the action a is finely adjusted in accordance with various changes in the accelerator operation amount PA as compared to a configuration in which only a single sampling value related to the accelerator operation amount PA is used as the independent variable.

(4) The independent variables of the action value function Q include the throttle opening degree instruction value TA*. This increases the degree of freedom for exploration by reinforcement learning as compared to, for example, a configuration in which a model-type parameter that models behavior of the throttle opening degree instruction value TA* is used as an independent variable related to the throttle opening degree.

Fourth Embodiment

A fourth embodiment will now be described with reference to the drawings. The differences from the third embodiment will mainly be discussed.

In the present embodiment, the relationship specifying data DR is updated outside the vehicle VC1.

Figure 9:
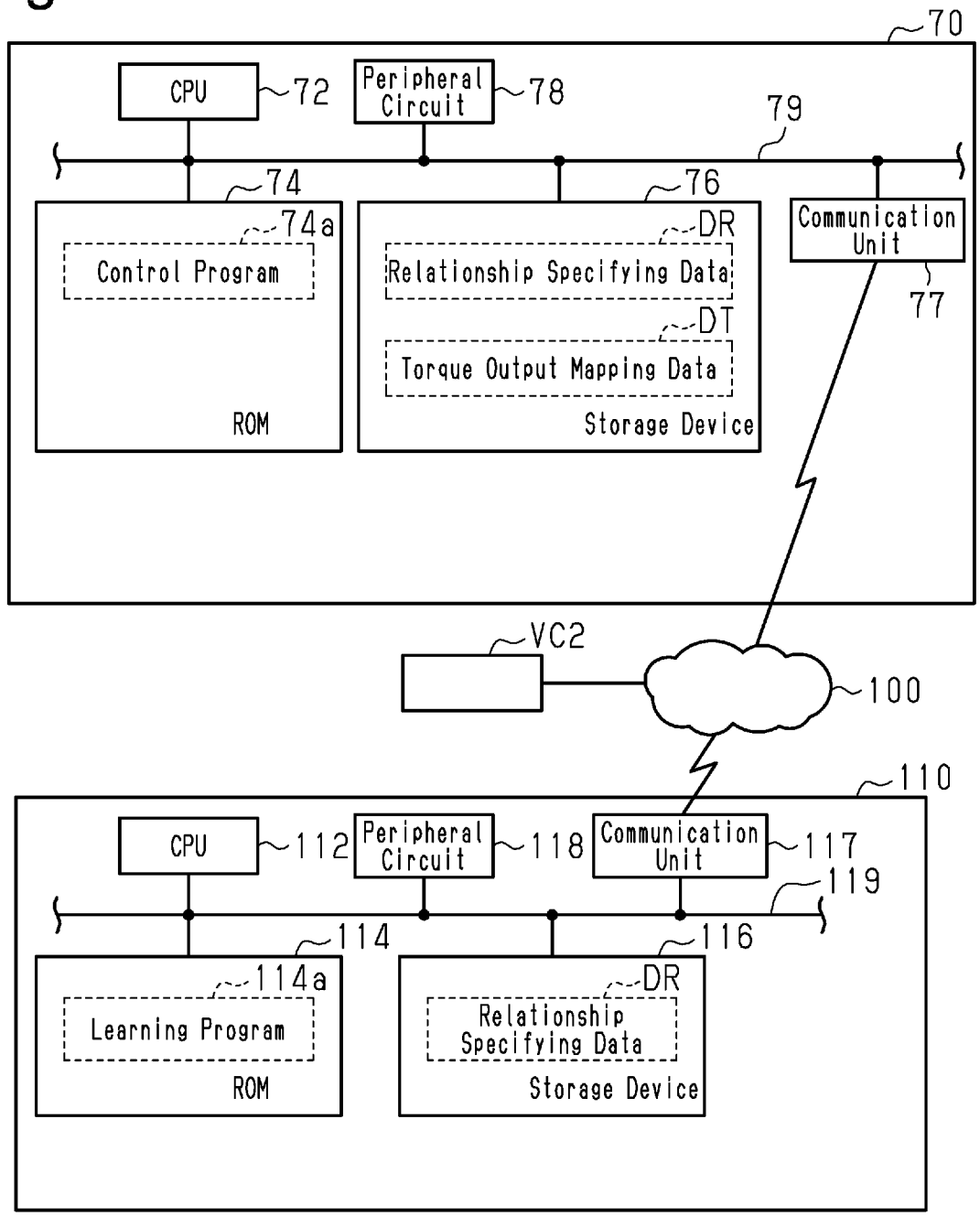
FIG. 9 is a diagram showing the configurations of a vehicle control system in a fourth embodiment.

FIG. 9 shows the configurations of a control system that executes reinforcement learning in the present embodiment. For the sake of convenience, in FIG. 9, the same reference numerals are given to the components that are the same as those in FIG. 1.

As shown in FIG. 9, the ROM 74 of the controller 70 arranged in the vehicle VC1 stores the control program 74a and does not store the learning program 74b. The controller 70 includes a communication unit 77. The communication unit 77 is configured to communicate with a data analysis center 110 through an external network 100 of the vehicle VC1.

The data analysis center 110 analyzes data transmitted from vehicles VC1, VC2, . . . . The data analysis center 110 includes a CPU 112, a ROM 114, an electrically rewritable nonvolatile memory (storage device 116), a peripheral circuit 118, and a communication unit 117, which are configured to communicate with each other through a local network 119. The ROM 114 stores a learning program 114a. The storage device 116 stores the relationship specifying data DR.

Figure 10:
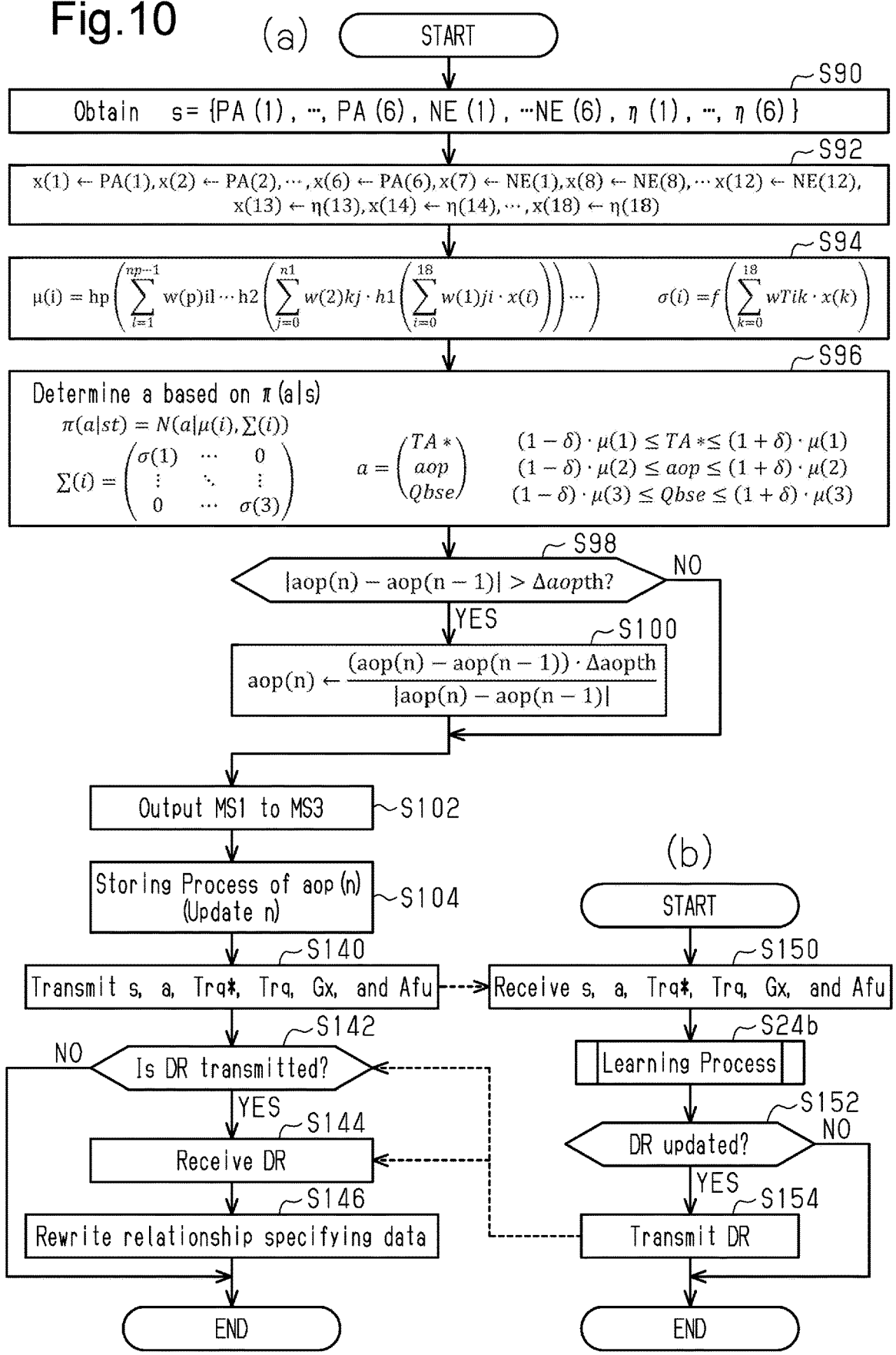
FIG. 10 is a flowchart showing the procedures of a process executed by the control system in the fourth embodiment.

FIG. 10 shows the procedures of a reinforcement learning process in the present embodiment. The process shown in (a) of FIG. 10 is implemented by the CPU 72 executing the control program 74a stored in the ROM 74 shown in FIG. 9. The process shown in (b) of 10 is implemented by the CPU 112 executing the learning program 114a stored in the ROM 114. For the sake of convenience, in FIG. 10, the same step numbers are given to the processes that correspond to those in FIG. 7. The process shown in FIG. 10 will be described below along a temporal sequence of reinforcement learning.

As shown in (a) of FIG. 10, the CPU 72 executes S90 to S104 and operates the communication unit 77 to transmit data used in the updating process of the relationship specifying data DR (S140). Data subject to transmission includes the state s, the action a, the torque instruction value Trq*, the torque Trq, the acceleration rate Gx, and the detection value Afu.

As shown in (a) of FIG. 10, the CPU 112 receives the transmitted data (S150) and updates the relationship specifying data DR based on the received data (S24b). The CPU 112 determines whether there is relationship specifying data DR that was updated and is to be transmitted (S152). If there is the relationship specifying data DR (S152: YES), the CPU 112 operates the communication unit 117 to transmit the relationship specifying data DR to the vehicle VC1 from which data was received in S150 (S154). In this process, when the number of times the relationship specifying data DR is updated is greater than or equal to a predetermined number of times, it may be determined that there is relationship specifying data DR that was updated and is to be transmitted. When the process of S154 is completed or a negative determination is made in S152, the CPU 112 temporarily ends the series of the processes shown in (b) of FIG. 10.

As shown in (a) of FIG. 10, the CPU 72 determines whether there is updated data (S142). If there is updated data (S142: YES), the CPU 72 receives the updated relationship specifying data DR (S144). The CPU 72 rewrites the relationship specifying data DR that is used in S96 with the received relationship specifying data DR (S146). When the process of S146 is completed or a negative determination is made in S142, the CPU 72 temporarily ends the series of the processes shown in (a) of FIG. 10.

In the present embodiment, the updating process of the relationship specifying data DR is executed outside the vehicle VC1. This reduces calculation loads on the controller 70. In addition, for example, when data is received from multiple vehicles VC1 and VC2 in S150, and S24b is executed, the number of pieces of data used in learning may be readily increased.

Correspondence Relationship

Correspondence relationship between the items in the embodiments described above and the items described in "Summary" is as follows. Hereinafter, the correspondence relationship is shown with each number of the aspects described in "Summary."

[1] The execution device, that is, the processing circuitry, corresponds to the CPU 72 and the ROM 74. The storage device corresponds to the storage device 76. The obtaining process corresponds to the processes of S10, S12, S20, S52, S66, S90, and S110. The operating process corresponds to the process of S18 in FIG. 2, the processes of S56 to S62 in FIG. 5, and the processes of S96 to S102 in FIG. 7. The reward calculation process corresponds to the processes of S34 to S38 in FIG. 4, the processes of S74 to S82 in FIG. 6, and the processes of S112 to S116 of FIG. 8. The updating process corresponds to the processes of S40 to S46 and the processes of S118 to S130. The updating mapping corresponds to a mapping specified by an instruction to execute S40 to S46 and a mapping specified by an instruction to execute S118 to S130 in the learning program 74b. In FIG. 3, the first value corresponds to "1" corresponding to the first speed. The first situation corresponds to a situation in which the transmission ratio corresponds to the second speed. The second situation corresponds to a situation in which the transmission ratio corresponds to the third speed. In FIG. 5, the first value corresponds to a value of an action variable that cannot be obtained when the rotation speed NE and the policy π are such that the absolute value of a difference from the previous rotation speed NE(n−1) is less than or equal to the predetermined value ΔNEth. The second situation corresponds to a situation in which the absolute value of a difference between the rotation speed NE and the previous rotation speed NE(n−1) is greater than the predetermined value ΔNEth. The first situation corresponds to a situation in which the absolute value of a difference between the rotation speed NE and the previous rotation speed NE(n−1) is less than or equal to the predetermined value ΔNEth.

[2] The relationship specifying data corresponds to the data illustrated in FIG. 3.

[3] The restriction process corresponds to the processes of S56 and S58 and the processes of S96 to S100.

[4, 5] The storing process corresponds to the process of S104. The restriction process corresponds to the processes of S98 and S100.

[6] The restriction process corresponds to the process of S96.

[7] The storing process corresponds to the process of S64. The correction process corresponds to the process of S58.

[8 to 10] The first execution device corresponds to the CPU 72 and the ROM 74. The second execution device corresponds to the CPU 112 and the ROM 114.

Other Embodiments

The embodiments may be modified as follows. The embodiments and the following modified examples can be combined as long as the combined modified examples remain technically consistent with each other.

Restriction Process

In the process shown in FIG. 7, the process that limits the absolute value of the difference from the previous retardation amount aop(n−1) is executed on only the retardation amount aop. However, there is no limitation to such a configuration. In an example, a process that limits the absolute value of a difference between the throttle opening degree instruction value TA* and its previous value may be executed. In another example, a process that limits the absolute value of a difference between the base injection amount Qbse and its previous value may be executed. Moreover, for example, while executing the process that limits the absolute value of the difference between the throttle opening degree instruction value TA* and its previous value, the process that limits the absolute value of the difference between the retardation amount aop and its previous value does not have to be executed.

In FIG. 7, in a process that prohibits operation in accordance with a value of an action variable when the selection probability indicated by the policy π is less than a predetermined value, the predetermined value is a selection probability of the value of the action variable when the absolute value of a difference from the average value μ equals "δ·μ" However, there is no limitation to such a configuration. For example, the predetermined value may be variably set using a variance as an input.

It is not necessary to execute both the process that limits the absolute value of a difference from the previous value and the process the prohibits operation in accordance with the value of the action variable when the selection probability indicated by the policy π is less than the predetermined value.

The restriction process is not limited to the process that restricts the absolute value of the difference from the previous action variable, the process that restricts the absolute value of the difference from the value of the previous state to restrict the absolute value of the difference from the previous action variable, and the process that restricts use of a value of the action variable having a low selection probability. A value of an action variable that will not become the greedy action through exploration or the like may be determined in advance. For example, when the accelerator operation amount PA is greater than or equal to a specified value that is greater than zero, a process that prohibits the throttle opening degree instruction value TA* from becoming zero may be executed.

Action Variable

In the process shown in FIG. 7, the throttle opening degree instruction value TA* is used as the action variable related to the opening degree of the throttle valve. However, there is no limitation to such a configuration. For example, the responsiveness of the throttle opening degree instruction value TA* to the accelerator operation amount PA may be expressed in a waste time and a secondary delay filter. Two variables specifying the waste time and the secondary delay filter may be added, and the three variables may be used as the variables related to the opening degree of the throttle valve. In this case, the state variable may be an amount of change in the accelerator operation amount PA per unit time instead of the time series data of the accelerator operation amount PA.

In the embodiments, the retardation amount aop is used as the action variable related to ignition timing. However, there is no limitation to such a configuration. For example, the ignition timing that is subject to correction by a knocking control system (KCS) may be used.

In the process shown in FIG. 7, the variable related to the opening degree of the throttle valve, the variable related to ignition timing, and the fuel injection amount are used as the action variables. However, there is no limitation to such a configuration. For example, among these three, only the variable related to the opening degree of the throttle valve and the fuel injection amount may be used as the action variables, or only the variable related to ignition timing and the fuel injection amount may be used as the action variables. Moreover, only one of the three may be used as the action variables.

As described in the section "Internal Combustion Engine," when the internal combustion engine is of a compression ignition type, a variable related to an injection amount may be used instead of the variable related to the opening degree of the throttle valve, and a variable related to injection timing may be used instead of the variable related to ignition timing. It is desirable that a variable related to the number of injections performed in one combustion cycle and a variable related to a time interval between the end time and the start time of two fuel injections for one cylinder that are adjacent on a time-series basis in one combustion cycle be included in addition to the variable related to injection timing.

For example, when the transmission 60 is a multi-speed transmission, the action variable may include a current value of a solenoid valve that hydraulically adjusts the engagement state of a clutch.

For example, as described below in the section "Vehicle," when the vehicle is a hybrid vehicle, an electric car, or a fuel cell vehicle, the action variable may include torque or output of a rotary electric machine. For example, when provided with an on-board air conditioner including a compressor configured to be rotated by rotational power of the crankshaft of the internal combustion engine, the action variable may include a load torque of the compressor. When provided with an electric on-board air conditioner, the action variable may include consumed power of the air conditioner.

State

In the embodiments, the time series data of the accelerator operation amount PA has six values that are sampled at equal intervals. However, there is no limitation to such a configuration. The data may have two or more sampling values that are obtained at different sampling timings. In this case, the data may have three or more sampling values and the data may be obtained at equal intervals.

The state variable related to the accelerator operation amount is not limited to the time series data of the accelerator operation amount PA and may be, for example, an amount of change in the accelerator operation amount PA per unit time as described in the section of "Action Variable."

In the process shown in FIG. 7, the time series data of the rotation speed NE has six values that are sampled at equal intervals. However, there is no limitation to such a configuration. The data may have two or more sampling values that are obtained at different sampling timings. In this case, the data may have three or more sampling values and the data may be obtained at equal intervals.

In the process shown in FIG. 7, the time series data of the charging efficiency η has six values that are sampled at equal intervals. However, there is no limitation to such a configuration. The data may have two or more sampling values that are obtained at different sampling timings. In this case, the data may have three or more sampling values and the data may be obtained at equal intervals.

In the process shown in FIG. 7, it is not necessary to use the time series data of each of the accelerator operation amount PA, the rotation speed NE, and the charging efficiency η. For example, the time series data of only the accelerator operation amount PA and the charging efficiency η may be used. When time series data of multiple variables is used, the variables do not necessarily have to have the same number of samplings.

For example, as described in the section of "Action Variable," when the action variable includes a current value of a solenoid valve, the state may include rotation speed of the input shaft 62 of the transmission, rotation speed of the output shaft 64, and hydraulic pressure adjusted by the solenoid valve. For example, as described in the section of "Action Variable," when the action variable includes torque or output of a rotary electric machine, the state may include the state of charge and the temperature of the battery. For example, as described in the section of "Action Variable," when the action includes a load torque of a compressor or consumed power of an air conditioner, the state may include the temperature of the vehicle interior.

Relationship Specifying Data

In the embodiments, the action value function Q is of a table-type. However, there is not limitation to such a configuration. For example, a function approximator may be used.

The data such that when the vehicle is in a first state corresponding to the first situation, the first value is defined as the value of the action variable, and when the vehicle is in a second state corresponding to the second situation, the first value is not defined as the value of the action variable, is not limited to that illustrated in FIG. 3. For example, in the process shown in FIG. 5, when the rotation speed NE is lower than the target rotation speed NE*, the value of the action variable when the throttle opening degree instruction value TA* is less than or equal to the predetermined value does not necessarily have to be defined in advance as the independent variable of the action value function Q.

Operating Process

For example, as described in the section of "Relationship Specifying Data," when the action value function is a function approximator, the action a that maximizes the action value function Q may be specified by inputting the state s and all combinations of discrete values of the action used as an independent variable of the table-type function in the embodiments into the action value function Q. More specifically, for example, while using mainly the specified action a for operation, another action may be selected at a predetermined probability.

Updating Mapping

In the processes of S40 to S46, an ε-soft on-policy Monte Carlo method is used. However, there is no limitation to such a configuration. For example, an off-policy Monte Carlo method may be used. Moreover, there is no limitation to a Monte Carlo method. For example, an off-policy temporal difference (TD) method may be used. An on-policy TD method such as a state-action-reward-state-action (SARSA) method may be used. An eligibility trace method may be used as on-policy learning.

The subject that is directly updated by the reward r is not limited to only one of the action value function Q and the policy π. For example, as an actor-critic method, each of the action value function Q and the policy π may be updated. Further, in the actor-critic method, for example, a value function V may be updated instead of the action value function Q.

"ε" determining the policy ε is not limited to a fixed value and may be changed in accordance with the progress degree of learning based on a predetermined rule. This may be implemented by, for example, setting "ε" to zero so that only the greedy action is selected when the value of the action value function Q converges. In this case, when the absolute value of the difference between the present rotation speed NE(n) and the previous rotation speed NE(n−1) is greater than the predetermined value ΔNEth, it is considered that the value of the action a will suddenly change in accordance with an element based on probability. Therefore, the processes of S56 and S58 are particularly of a great utility value.

Reward Calculation Process

In the process of FIG. 4, the reward is assigned based on whether the logical conjunction of conditions (A) and (B) is true. However, there is no limitation to such a configuration. For example, a process that assigns a reward based on whether condition (A) is satisfied and a process that assigns a reward based on whether condition (B) is satisfied may be executed. Moreover, for example, only one of the process that assigns a reward based on whether condition (A) is satisfied and the process that assigns a reward based on whether condition (B) is satisfied may be executed.

The criterion related to the drivability is not limited to that described above and may be set in accordance with, for example, whether noise or vibration intensity meets a criterion. Furthermore, any one or more of whether the acceleration rate meets a criterion, whether the response of the torque Trq meets a criterion, whether noise meets a criterion, and whether vibration intensity meets a criterion may be used.

The reward calculation process may include all of the three processes, that is, the process that assigns the reward r in accordance with whether the criterion related to drivability is met, the process that assigns a greater reward when the energy usage efficiency meets a criterion than when it does not meet the criterion, and the process that assigns a greater reward when the fuel consumption rate meets a criterion than when it does not meet the criterion. Alternatively, the reward calculation process may include one or two of the three processes.

In addition, for example, as described in the section of "Action Variable," when the action variable includes a current value of the solenoid valve of the transmission 60, the reward calculation process may include, for example, at least one of the following three processes (a) to (c).

Process (a) assigns a greater reward when the transmission switches the transmission ratio within a predetermined time than when the time taken to switch the transmission ratio exceeds the predetermined time.

Process (b) assigns a greater reward when the absolute value of a change rate of rotation speed of the input shaft 62 of the transmission is less than or equal to an input-side predetermined value than when the absolute value is greater than the input-side predetermined value.

Process (c) assigns a greater reward when the absolute value of a change rate of rotation speed of the output shaft 64 of the transmission is less than or equal to an output-side predetermined value than when the absolute value is greater than the output-side predetermined value.

For example, as described in the section of "Action Variable," when the action variable includes torque or output of a rotary electric machine, the following processes may be included. That is, a process assigns a greater reward when the state of charge of the battery is within a predetermined range than when the state of charge is outside the predetermined range, and a process assigns a greater reward when the temperature of the battery is within a predetermined range than when the temperature of the battery is outside the predetermined range. For example, as described in the section of "Action Variable," when the action variable includes a load torque of a compressor or consumed power of an air conditioner, a process may be additionally executed to assign a greater reward when the temperature of the vehicle interior is within a predetermined range than when the temperature of the vehicle interior is outside the predetermined range.

Vehicle Control System

In the example shown in FIG. 10, the entire process of S24b is executed by the data analysis center 110. However, there is not limitation to such a configuration. For example, the data analysis center 110 may be configured to execute the processes of S118 to S130 and not to execute the processes of S112 to S116, which correspond to the reward calculation process. In S140, the result of the processes of S114 and S116 may be transmitted.

The vehicle control system is not limited to one configured by the controller 70 and the data analysis center 110. For example, instead of the data analysis center 110, a mobile terminal carried by a user may be used so that the vehicle control system is configured by the controller 70 and the mobile terminal. Alternatively, for example, the vehicle control system may be configured by the controller 70, the mobile terminal, and the data analysis center 110. This is implemented by, for example, the mobile terminal executing the processes of S94 and S96 shown in FIG. 10.

Execution Device

The execution device is not limited to a device that includes the CPU 72 (112) and the ROM 74 (114) and executes the software processes. For example, a dedicated hardware circuit (e.g., ASIC, etc.) configured to process at least some of the software processes executed in the embodiments may be provided. More specifically, the execution device may have any one of the following configurations (a) to (c). Configuration (a) includes a processor that executes all of the above-described processes according to programs and a program storage device such as a ROM that stores the programs. Configuration (b) includes a processor and a program storage device that execute some of the above-described processes in accordance with programs and a dedicated hardware circuit that executes the remaining processes. Configuration (c) includes a dedicated hardware circuit that executes all of the above-described processes. Multiple software execution devices each including a processor and a program storage device and multiple dedicated hardware circuits may be provided. More specifically, the above-described processes may be executed by processing circuitry that includes at least one of one or more software execution devices or one or more dedicated hardware circuits. The program storage device, that is, a computer readable medium, includes any medium that can be accessed from a general-purpose computer or a dedicated computer.

Storage Device

In the embodiments, the storage device that stores the relationship specifying data DR is different from the storage device (ROM 74) that stores the learning program 74b and the control program 74a.

Internal Combustion Engine

The internal combustion engine is not limited to one including a port injection valve that injects fuel into the intake passage 12 as a fuel injection valve and may be, for example, one including a direct injection valve that directly injects fuel into the combustion chamber 24 or one including both a port injection valve and a direct injection valve.

The internal combustion engine is not limited to a spark ignition type internal combustion engine and may be, for example, a compression ignition type internal combustion engine that uses, for example, light oil as fuel.

Vehicle

The vehicle is not limited to a vehicle in which an internal combustion engine is only a thrust force generator. The vehicle may be, for example, a hybrid vehicle including an internal combustion engine and a rotary electric machine. Alternatively, the vehicle may be, for example, an electric car or a fuel cell vehicle that does not include an internal combustion engine and includes a rotary electric device as a thrust force generator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle controller, comprising:
   processing circuitry;
   and a storage device, wherein
   the storage device stores relationship specifying data that specifies a relationship between a state of a vehicle and an action variable,
   the action variable is a variable related to an operation of an electronic device in the vehicle,
   the processing circuitry is configured to execute
     an obtaining process that obtains a state of the vehicle based on a detection value of a sensor,
     an operating process that operates the electronic device based on a value of the action variable determined by the state of the vehicle obtained by the obtaining process and the relationship specifying data,
     a reward calculation process that assigns a reward based on the state of the vehicle obtained by the obtaining process, wherein the reward assigned when a property of the vehicle meets a criterion is greater than the reward assigned when the property of the vehicle does not meet the criterion, and
     an updating process that updates the relationship specifying data using the state of the vehicle obtained by the obtaining process, the value of the action variable used for operation of the electronic device, and the reward corresponding to the operation as inputs to a predetermined updating mapping,
   the updating mapping outputs the relationship specifying data that has been updated to increase an expected return of the reward when the electronic device is operated in accordance with the relationship specifying data, and
   when a value of the action variable designated by the relationship specifying data is a first value, a process in which the operating process operates the electronic device in accordance with the first value is executable in a first situation and is not executable in a second situation.

2. The vehicle controller according to claim 1, wherein
   a state of the vehicle corresponding to the first situation is a first state,
   a state of the vehicle corresponding to the second situation is a second state, and
   in the relationship specifying data, the first value is defined as a value of the action variable for the first state, whereas the first value is not defined as a value of the action variable for the second state.

3. The vehicle controller according to claim 1, wherein
   the operating process includes a restriction process,
   when the value of the action variable designated by the relationship specifying data is the first value, the restriction process allows a process that operates the electronic device in accordance with the first value in the first situation, and
   when the value of the action variable designated by the relationship specifying data is the first value, the restriction process prohibits a process that operates the electronic device in accordance with the first value in the second situation.

4. The vehicle controller according to claim 3, wherein
   the first situation is a situation in which an absolute value of a difference between a previous value of the action variable and the first value is less than or equal to a predetermined value, and
   the second situation is a situation in which the absolute value of the difference between the previous value of the action variable and the first value is greater than the predetermined value.

5. The vehicle controller according to claim 4, wherein the restriction process includes
   a storing process that stores the previous value of the action variable, and
   a process that restricts a present value of the action variable so that an absolute value of a difference between the present value of the action variable and the previous value of the action variable is less than or equal to a predetermined value.

6. The vehicle controller according to claim 3, wherein
   the relationship specifying data includes data specifying a function approximator that uses the state of the vehicle as an input and outputs a selection probability of a value of the action variable,
   the updating mapping includes a mapping that outputs an update amount of a parameter that specifies the function approximator,
   the restriction process includes a process that prohibits an operation of the electronic device in accordance with a value of the action variable having a selection probability output by the function approximator that is less than a predetermined value,
   the first situation is a situation in which a selection probability of the first value is greater than or equal to the predetermined value, and
   the second situation is a situation in which the selection probability of the first value is less than the predetermined value.

7. The vehicle controller according to claim 4, wherein the restriction process includes
   a storing process that stores a previous value of a value of a variable indicating the state that is used to calculate a value of the action variable together with the relationship specifying data, and
   a correction process that corrects the value of the variable indicating the state, when an absolute value of a difference between the previous value and a present value of the value of the variable indicating the state is greater than a specified value, so that the absolute value of the difference from the previous value is less than or equal to the specified value.

8. A vehicle control system, comprising:
   the processing circuitry and the storage device according to claim 1, wherein
   the processing circuitry includes a first execution device mounted on the vehicle and a second execution device that is different from an on-board device,
   the second execution device is configured to execute at least the updating process, and
   the first execution device is configured to execute at least the obtaining process and the operating process.

9. A vehicle controller, comprising:
   the first execution device according to claim 8.

10. A learning device for a vehicle, the learning device, comprising:
    the second execution device according to claim 8.

* * * * *